Oct. 19, 1954　　　　　C. SCHRAMM　　　　　2,692,136
MACHINE FOR ASSEMBLING BOOK COMPONENTS
Filed Nov. 15, 1950　　　　　　　　　　　　10 Sheets-Sheet 1

INVENTOR
CARL SCHRAMM
BY S. Jay Teller
ATTORNEY

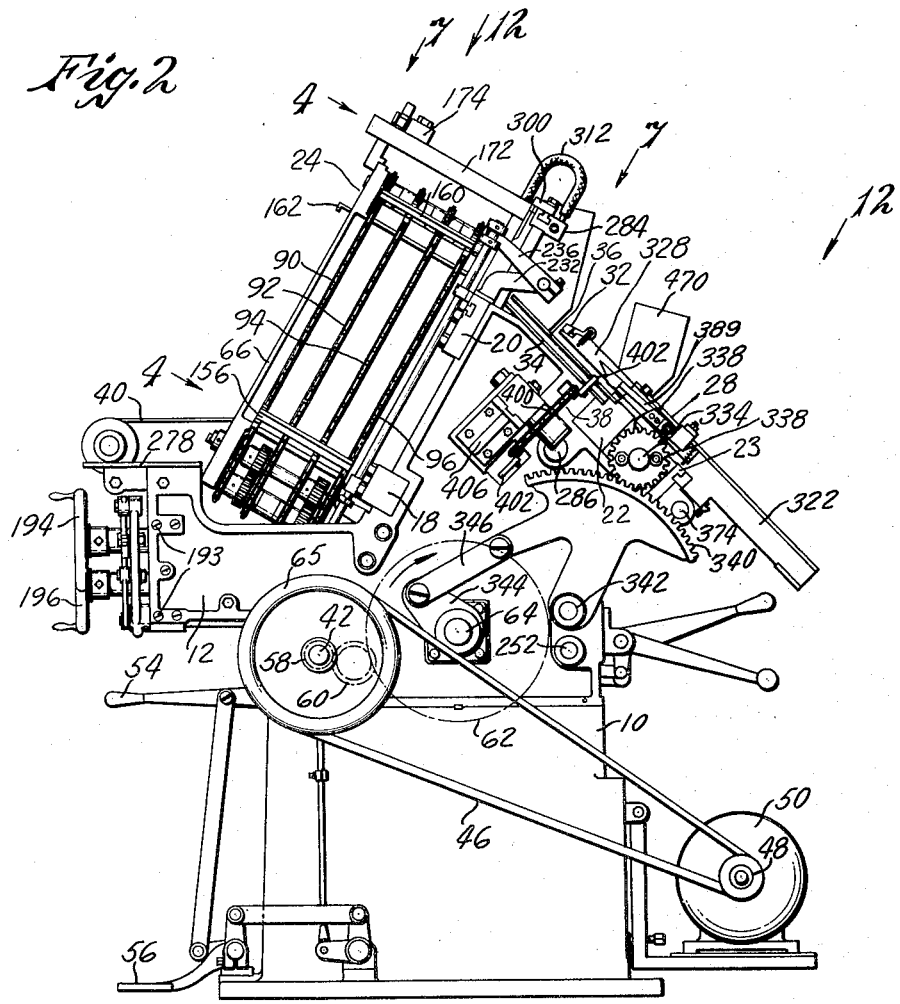

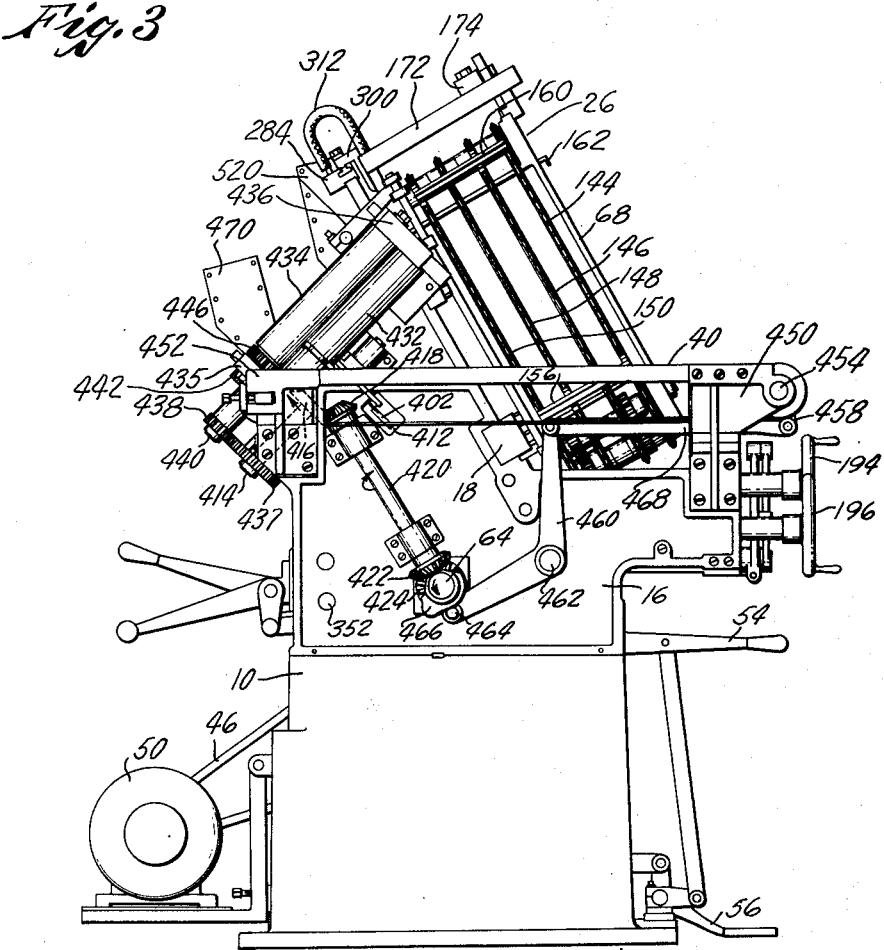
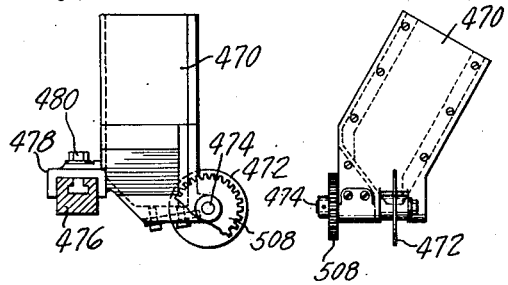
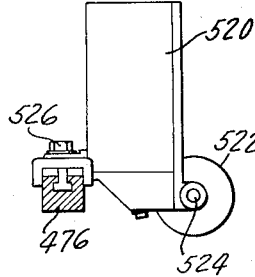
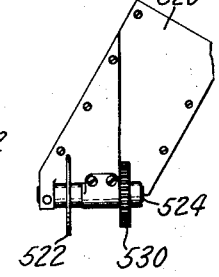

Oct. 19, 1954
C. SCHRAMM
2,692,136
MACHINE FOR ASSEMBLING BOOK COMPONENTS
Filed Nov. 15, 1950
10 Sheets-Sheet 4
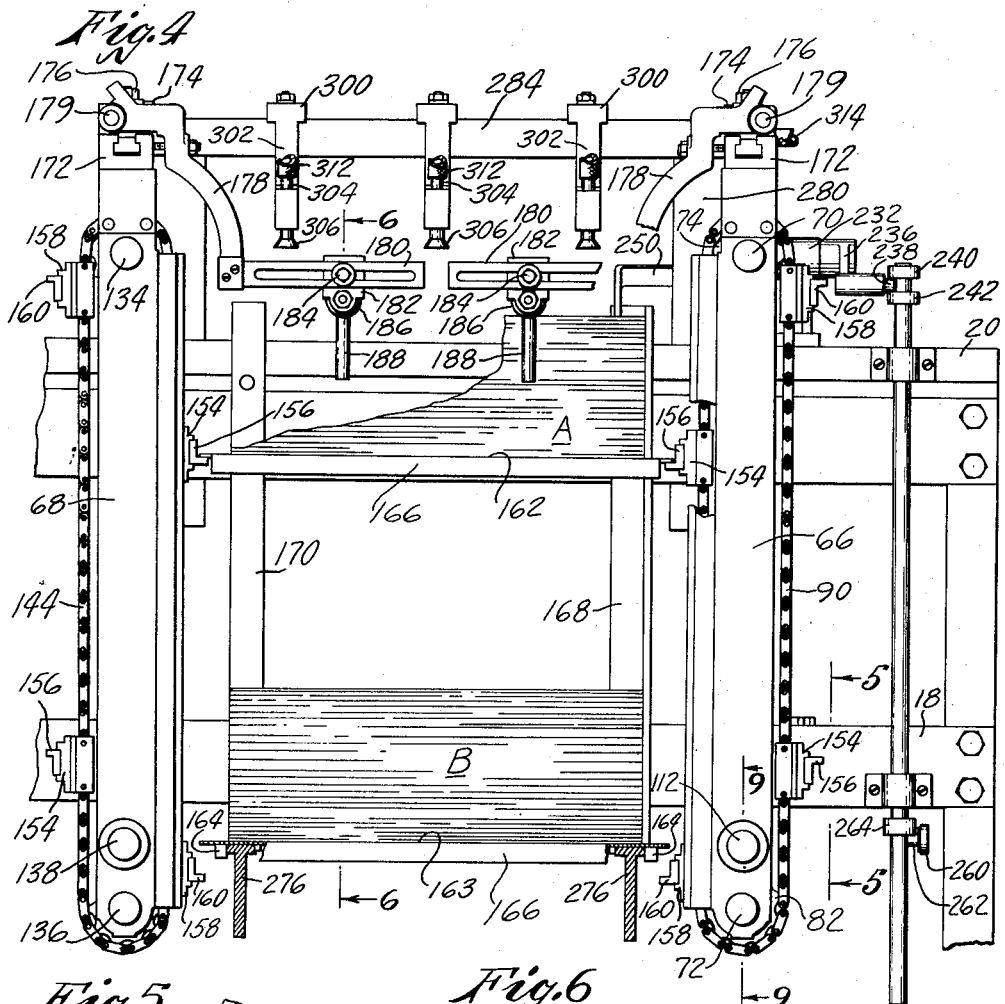
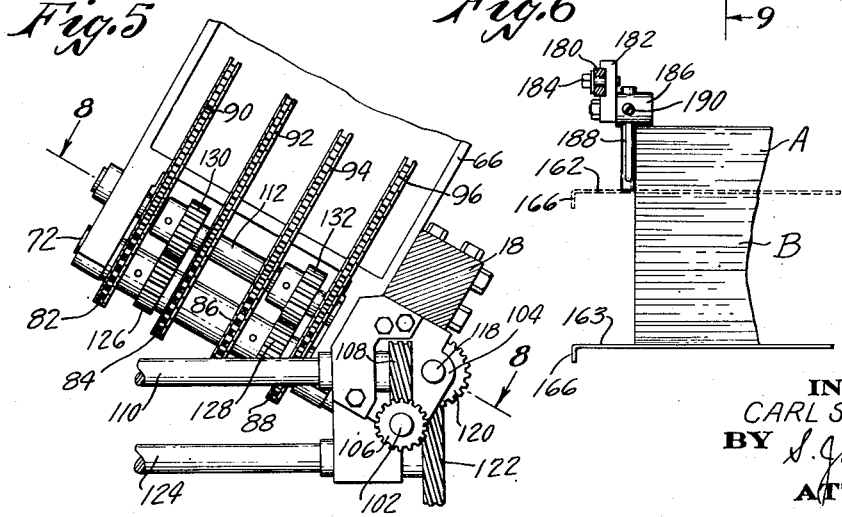
INVENTOR
CARL SCHRAMM
BY S. Jay Teller
ATTORNEY

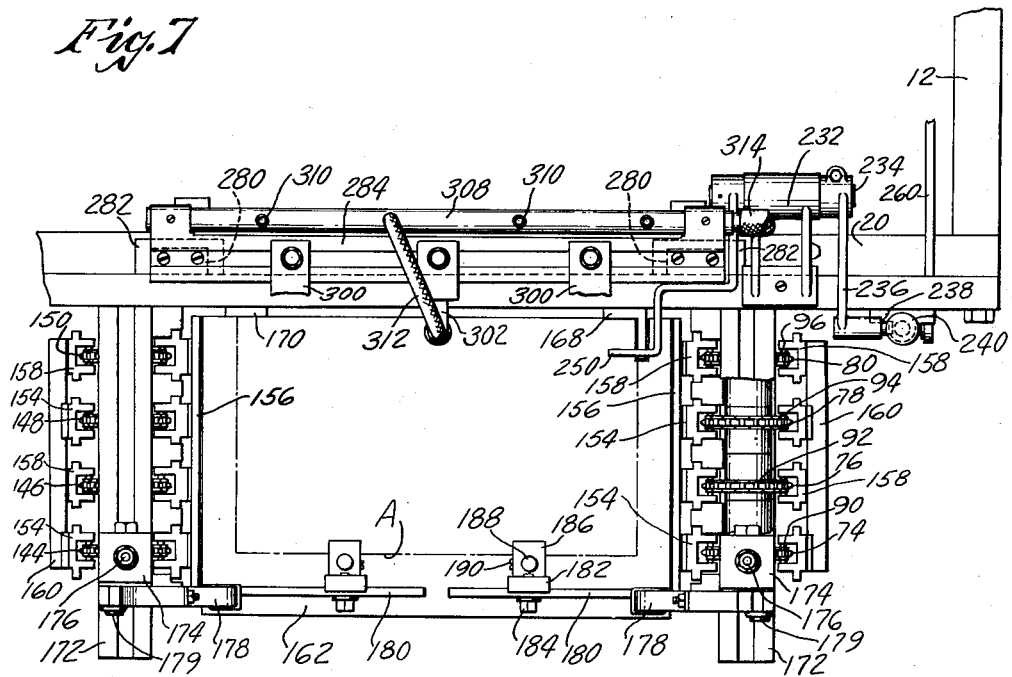
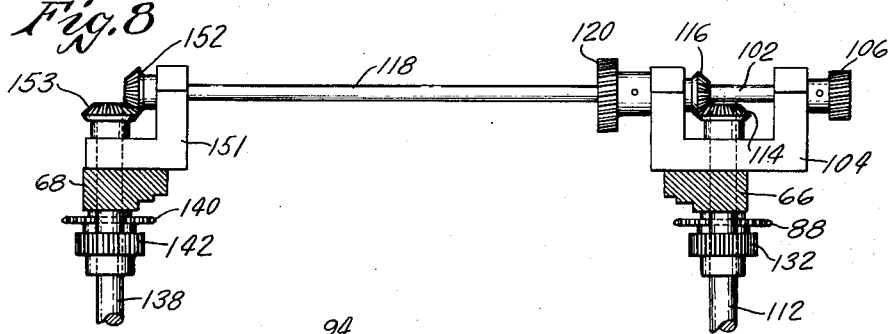
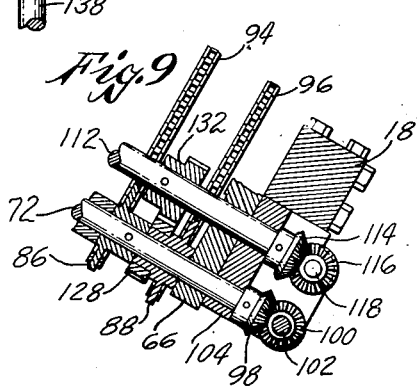

Oct. 19, 1954   C. SCHRAMM   2,692,136
MACHINE FOR ASSEMBLING BOOK COMPONENTS
Filed Nov. 15, 1950   10 Sheets-Sheet 6
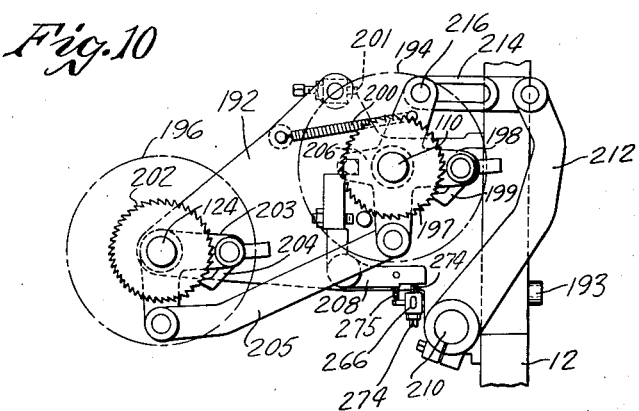
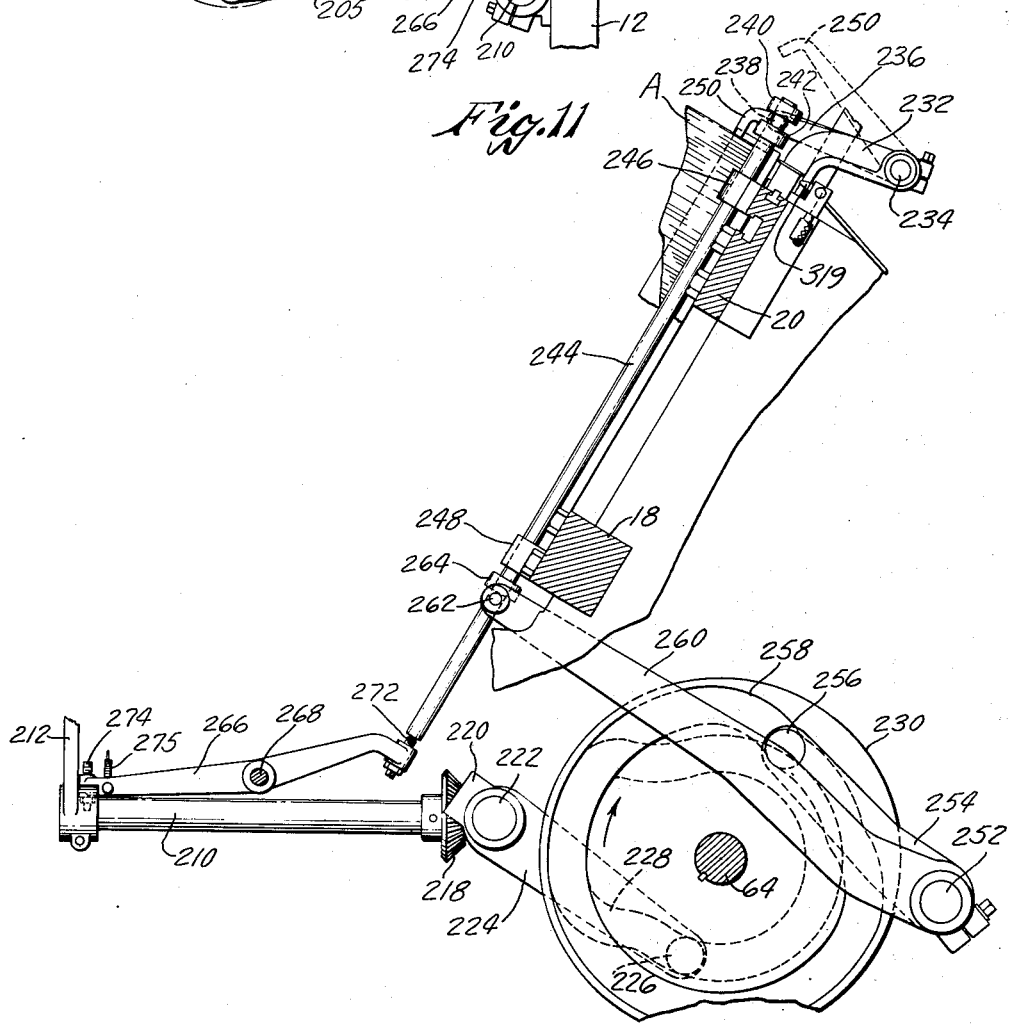
INVENTOR
CARL SCHRAMM
BY S. Jay Teller
ATTORNEY Oct. 19, 1954     C. SCHRAMM     2,692,136
MACHINE FOR ASSEMBLING BOOK COMPONENTS
Filed Nov. 15, 1950     10 Sheets-Sheet 7

INVENTOR
CARL SCHRAMM
BY S. Jay Teller
ATTORNEY

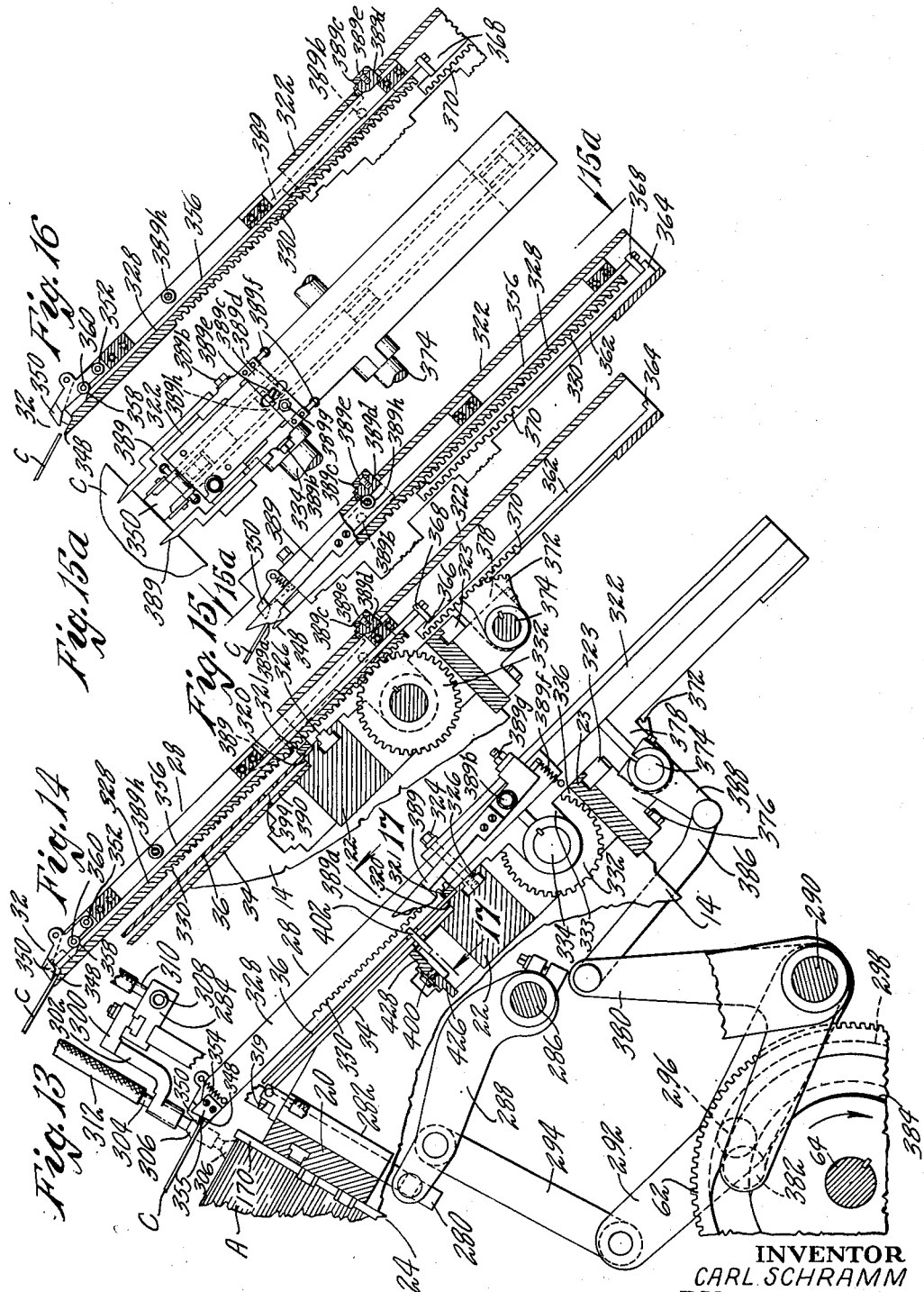

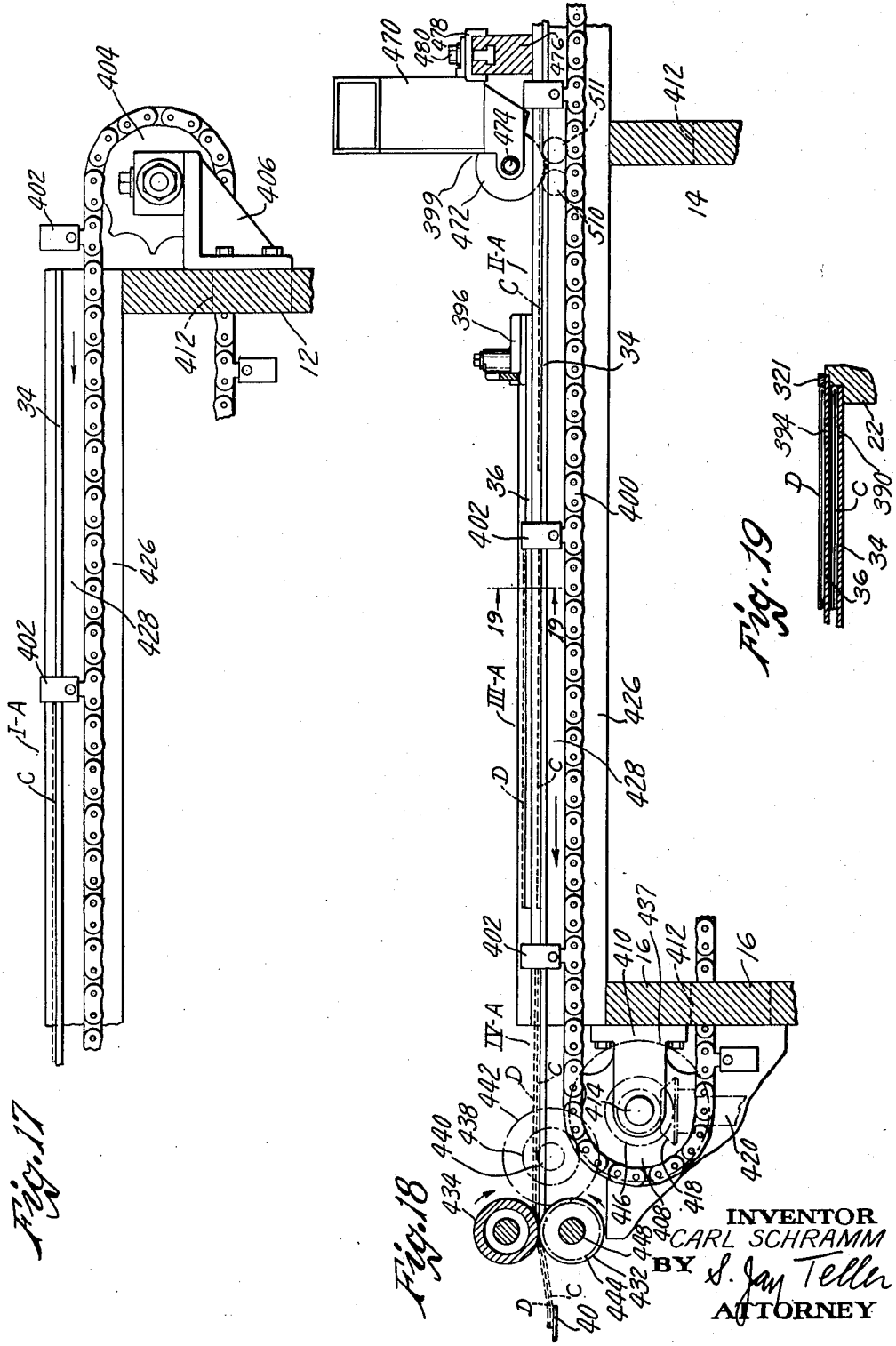

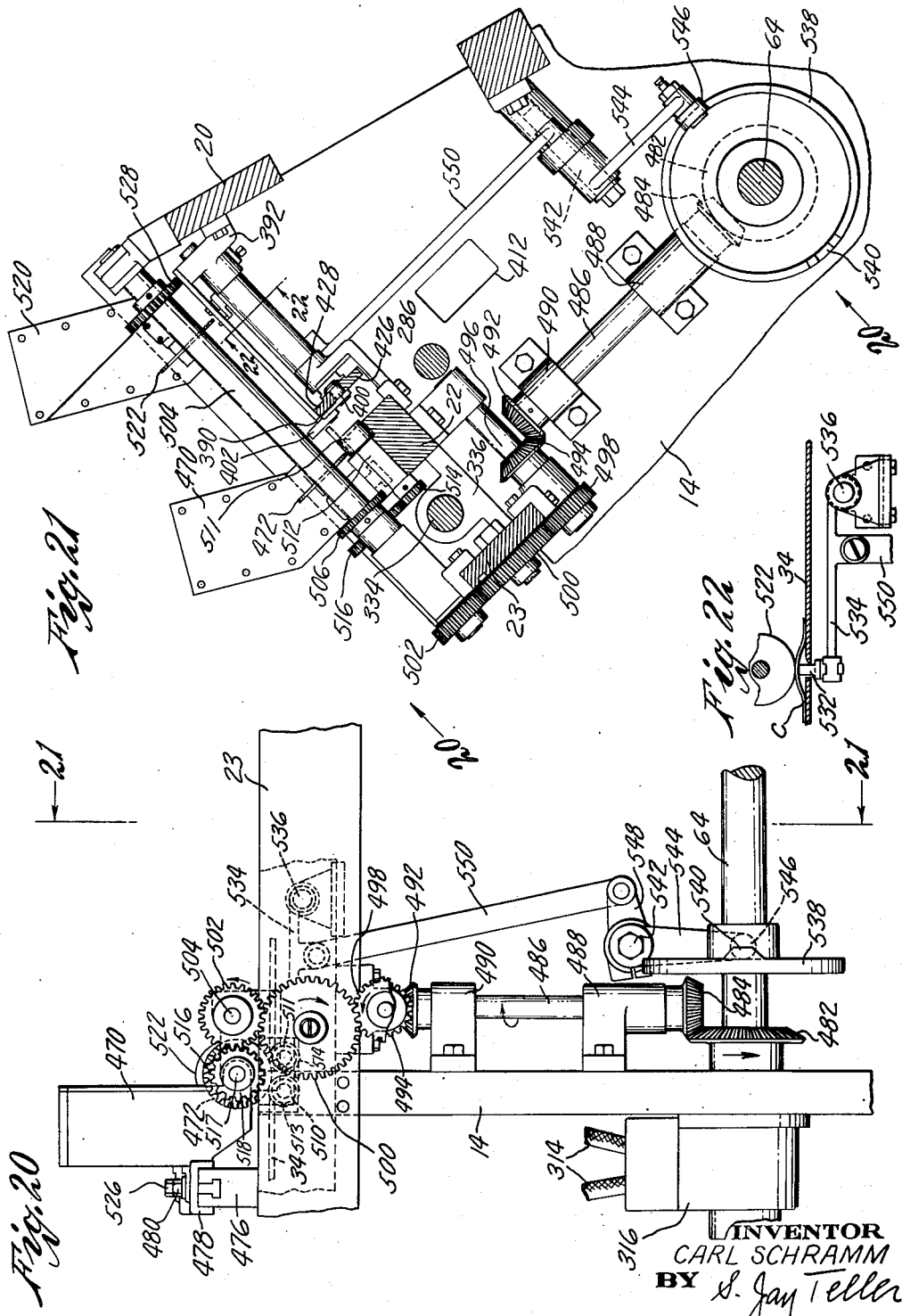

Patented Oct. 19, 1954

2,692,136

UNITED STATES PATENT OFFICE 2,692,136

MACHINE FOR ASSEMBLING BOOK COMPONENTS

Carl Schramm, North Coventry, Conn., assignor to The Smyth Manufacturing Company, Hartford, Conn., a corporation of Connecticut Application November 15, 1950, Serial No. 195,888

31 Claims. (Cl. 270—53)

The invention relates to a machine for assembling and preferably pasting components of books, more particularly signatures and end sheets. The general object of the invention is to provide an improved semi-automatic machine adapted to withdraw successive signatures and end sheets or other book components from stacks held in suitable stack mechanisms, to assemble and preferably paste the successive components, and finally to deliver the assembled and preferably pasted components at a suitable location.

Further and more specific objects of the invention are to provide various advantageous features of construction and arrangement whereby the foregoing more general object is attained.

This application is a continuation-in-part of my copending application for Machine for Assembling Book Components, Serial No. 764,236, filed July 28, 1947, and now abandoned. The stack mechanisms for holding and supplying the book components are not herein claimed specifically, the said stack mechanisms being set forth and claimed in my copending application for Stack Mechanism for Book Components, Serial No. 196,170, filed November 17, 1950, which last said application is a division of the said application Serial No. 764,236.

In the drawings I have shown in detail a preferred embodiment of the invention, but it will be understood that various changes may be made from the construction shown, and that the drawings are not to be construed as defining or limiting the scope of the invention, the claims forming a part of this specification being relied upon for that purpose.

Of the drawings:

Fig. 2 is a right end view with certain details of the stack mechanism omitted.

Fig. 3 is a left end view with certain details of the stack mechanism omitted.

Fig. 4 is an enlarged front view of the right stack mechanism taken in the direction of the arrows 4, 4 in Fig. 2.

Fig. 5 is a fragmentary sectional view taken along the line 5—5 of Fig. 4.

Fig. 6 is a fragmentary sectional view taken along the line 6—6 of Fig. 4 but showing the parts in different relative positions.

Fig. 7 is an enlarged fragmentary plan view of the stack mechanism shown in Fig. 4, this view being taken in the direction of the arrows 7, 7 in Fig. 2.

Fig. 8 is a fragmentary horizontal sectional view taken along the line 8—8 of Fig. 5.

Fig. 9 is a fragmentary transverse vertical sectional view taken along the line 9—9 of Fig. 4.

Fig. 10 is an enlarged fragmentary front view of the operating and controlling mechanism for the stack mechanism shown in Figs. 4 and 7.

Fig. 11 is a fragmentary transverse vertical sectional view taken along the line 11—11 of Fig. 1, but with various parts omitted.

Fig. 13 is an enlarged fragmentary vertical sectional view taken along the line 13—13 of Fig. 12.

Fig. 14 is a fragmentary sectional view in some respects similar to Fig. 13 but with the vertical section taken through one of the transfer mechanisms.

Fig. 15 is a fragmentary view similar to Fig. 14, but showing the parts in different relative positions.

Fig. 15A is a fragmentary view taken in the direction of the arrows 15A—15A in Fig. 15.

Fig. 16 is a fragmentary view similar to the upper part of Fig. 14 but showing the parts in different relative positions.

Fig. 17 is an enlarged fragmentary sectional view, with various parts omitted, taken along the lines 17—17 of Figs. 12 and 13.

Fig. 18 is an enlarged fragmentary sectional view, with various parts omitted, taken along the line 18—18 of Fig. 12.

Fig. 19 is a fragmentary sectional view, partly diagrammatic, taken along the line 19—19 of Fig. 18.

Fig. 20 is an enlarged fragmentary rear view of the central portion of the machine taken in the direction of the arrows 20, 20 in Fig. 21.

Fig. 21 is an enlarged fragmentary vertical sectional view taken along the line 21—21 of Fig. 12 and along the line 21—21 of Fig. 20.

Fig. 22 is a fragmentary sectional view taken along the line 22—22 of Fig. 21.

Figs. 23 and 24 are rear and left side views respectively of one paste box.

Figs. 25 and 26 are rear and left side views respectively of the other paste box.

General organization

Figure 1:
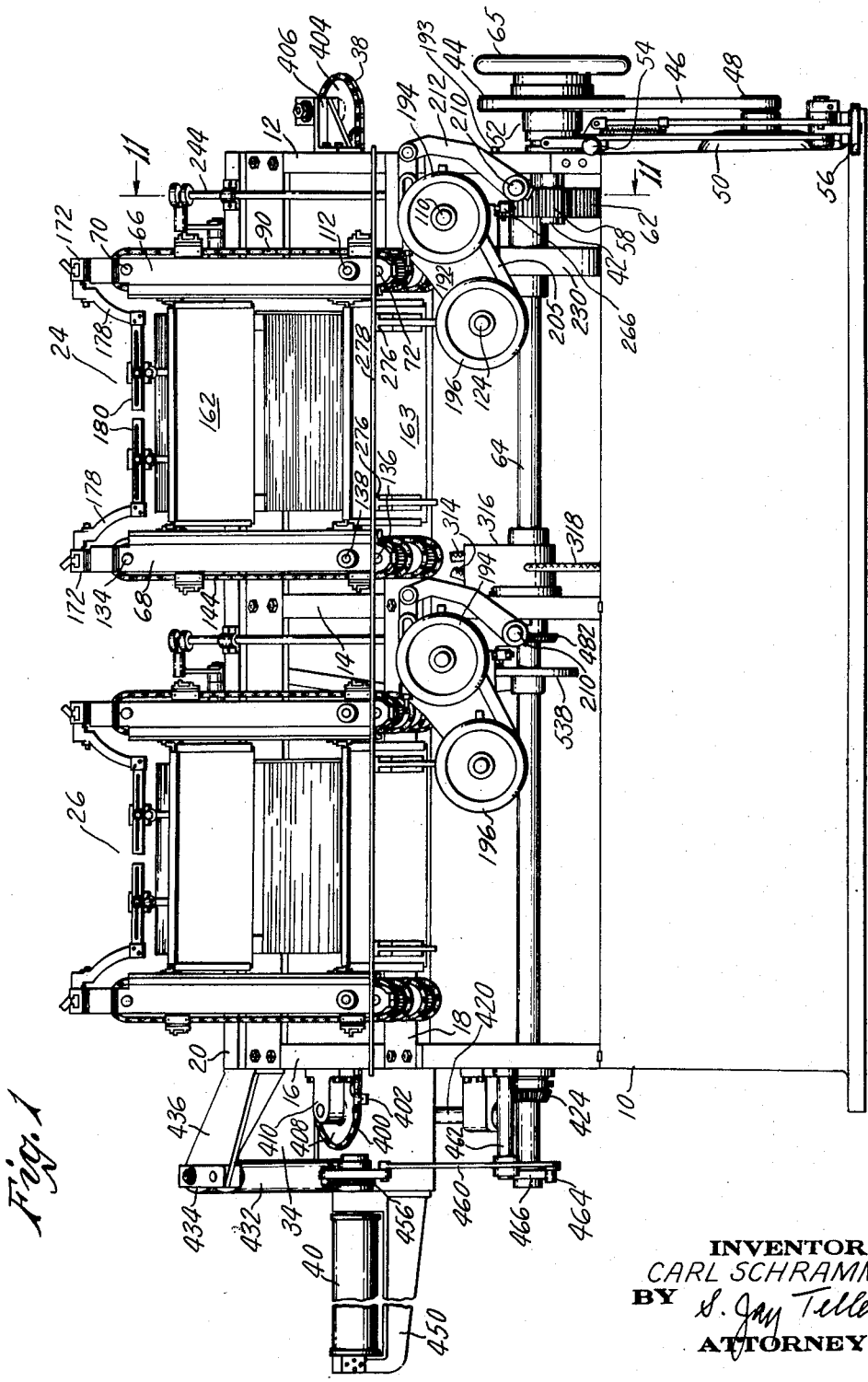
Fig. 1 is a front view of a machine embodying the invention, this view omitting certain parts, more particularly longitudinal shafts and associated parts in the interior.

Referring particularly to Figs. 1, 2, 3 and 12, the machine comprises a base 10 on which is mounted a main framework which may be variously constructed, but which as shown comprises three upright transverse plates 12, 14 and 16 spaced apart longitudinally and connected by longitudinal bars 18, 20, 22 and 23. The machine includes a plurality of stack mechanisms, and while the number of stack mechanisms may be varied two are ordinarily sufficient, these being shown at 24 and 26. These stack mechanisms may be identical in construction and are so shown. Each stack mechanism is adapted to support a stack of signatures or end sheets or other book components. For instance, the right stack mechanism 24 may support a stack of book signatures, and the left stack mechanism 26 may support a stack of folded end sheets to be assembled with the signatures. The terms "book component" or "component" will be used throughout the specification and claims as generic terms to include a signature or an end sheet or any other similar book component. The terms "signatures" and "end sheets" will also be used for convenience of description, but it will be understood that the invention is not in any way limited to the handling of signatures and end sheets. It may, for example, be used for the pasting of charts, plates or other book inserts in place on signatures.

Each stack mechanism is preferably provided with means serving to maintain the top of the stack substantially at a predetermined level so that single components can conveniently be withdrawn successively therefrom at the rear. Preferably, each stack mechanism 24 and 26 is inclined rearward at a substantial angle partly to assure the uniform positioning of the stack therein and partly to facilitate the withdrawal of successive components from the top of the stack. Inasmuch as each stack mechanism permits single components to be withdrawn successively from the top of the stack, the machine is adapted for handling a wide variety of book components, as for instance single unfolded sheets. If each stack mechanism were of the type wherein the components are withdrawn from the bottom of the stack, the machine would not be adapted for handling single sheets.

Associated with the respective stack mechanisms are two similar mechanisms for withdrawing successive components from the tops of the stacks and for transferring the said components rearward and preferably downward. Each transfer mechanism preferably comprises separate units which are indicated generally at 28, 28 and 30, 30 in Fig. 12, and one of the said mechanisms 28 is also shown in Fig. 2. As shown, there are two transfer units in transverse register with each stack of components. Each transfer unit includes a device generally indicated at 32 for engaging and gripping a component at the top of the corresponding stack, the gripping device of each unit being reciprocated during each cycle in a path extending rearward and preferably downward from the top of the stack. The components withdrawn from the stacks by the said transfer units are deposited respectively on shelves which are at different levels. The number of shelves corresponds to the number of stack mechanisms, and when there are two stack mechanisms there are two shelves 34 and 36, the upper shelf 36 being much shorter than the lower shelf 34, as more clearly shown in Figs. 12, 17 and 18. The lower shelf has first and second end portions at the right and at the left as viewed in Fig. 18 which respectively project longitudinally in opposite directions beyond the upper shelf. The two components on the said shelves are initially out of transverse register with each other, being spaced apart longitudinally, one of them being on the first projecting portion of the lower shelf and the other of them being on the upper shelf. The component on the first projecting portion of the lower shelf is preferably pasted at least along a zone adjacent one edge thereof by means of a suitable pasting device. By means of a mechanism generally indicated at 38, one of the components is moved longitudinally along the longer lower shelf toward the left until it is brought into face-to-face register with the other component on the shorter upper shelf and thereafter both components are moved in unison toward the left. The component on the upper shelf moves off from the said shelf into engagement with the component of the lower shelf, the two components then being on the second projecting portion of the lower shelf. When one of the components has been pasted, adherence is effected along the zone of pasting. The assembled components may be pressed to cause more effective adherence at the said zone of pasting and thereafter the assembled and pasted components are delivered onto a conveyor belt 40 at the left which carries them forward toward the front of the machine.

Mounted in suitable bearings in the main frame is a longitudinal drive shaft 42 carrying a belt pulley 44. A belt 46 passes over the pulley 44 and also over a pulley 48 on a motor 50. The pulley 44 is rotatably mounted on the shaft 42 and may be connected therewith by a clutch 52 operable by means of a hand lever 54 or a foot treadle 56. Mounted on the drive shaft 42 is a pinion 58 meshing with an idler gear 60 which in turn meshes with a gear 62 on a longitudinal main shaft 64 mounted in suitable bearings in the main frame. The timing is such that the shaft 64 makes one complete revolution for each cycle of the machine. A hand wheel 65 may be provided on the shaft 42 for manually operating the machine during set-up and adjustment.

Stack mechanisms

As stated at the outset, book components are successively removed from the tops of the stacks A in both stack mechanisms 24 and 26, thus tending to lower the levels of the tops of the stacks, which levels are restored from time to time by the mechanisms to be described.

The two stack mechanisms 24 and 26 may be identical in construction as already stated, and a detailed description of one of them will be sufficient. The descrpition may be regarded as applying particularly to the stack mechanism 24 at the right. As already stated, the stack mechanisms are preferably positioned at a substantial angle, but such positioning is not in all instances essential. Therefore, such terms as "vertical" and "horizontal" will for the sake of convenience be used in describing the inclined parts.

For a more detailed description reference will be had particularly to Figs. 4 to 9. Each stack mechanism comprises two frame elements 66 and 68 secured to the longitudinal bars 18 and 20 of the main frame. Carried by the frame element 66 and respectively located near the top and bottom thereof are transverse shafts 70 and 72. Carried by the upper shaft 70 and spaced therealong are four similar sprocket wheels 74, 76, 78 and 80. All of the said sprocket wheels may be rotatable relatively to the shaft. Carried by the lower shaft 72 and similarly spaced therealong are four sprocket wheels 82, 84, 86 and 88, as shown in Fig. 5. Endless chains 90, 92, 94 and 96 extend over the respective pairs of sprocket wheels 74—82, 76—84, 78—86 and 80—88.

As shown in Fig. 9, the shaft 72 can be intermittently rotated in the clockwise direction by means of a bevel gear 98 at the rear end thereof which meshes with a bevel gear 100 on a longitudinal shaft 102 supported in a bracket 104 secured to the frame 66. The shaft 102 carries a worm wheel 106, shown in Figs. 5 and 8, which meshes with a worm 108 mounted at the rear end of a transverse horizontal shaft 110 extending forward to the front of the machine. The shaft 110 is intermittently rotated by mechanism to be presently described and it will be seen that intermittent rotation of the shaft 110 causes intermittent rotation of the shaft 72. Two of the sprocket wheels 82, 84, 86 and 88, as for instance the sprocket wheels 82 and 86, are rigidly connected with the shaft 72 and therefore intermittent movement of the shaft 72 causes intermittent movement of the corresponding chains 90 and 94.

Mounted in the frame element 66 immediately above the shaft 72 is a rotatable shaft 112. As shown in Fig. 9, the shaft 112 can be intermittently rotated in the counterclockwise direction by means of a bevel gear 114 at the rear end thereof which meshes with a bevel gear 116 on a longitudinal shaft 118 supported in the aforesaid bracket 104. The shaft 118 carries a worm wheel 120 shown in Figs. 5 and 8, which meshes with a worm 122 mounted at the rear end of a transverse horizontal shaft 124 extending forward to the front of the machine. The shaft 124 is intermittently rotated by mechanism to be presently described, and it will be seen that intermittent rotation of the shaft 124 causes intermittent rotation of the shaft 112. The sprockets 84 and 88 are not rigidly connected with the shaft 72 but are rotatable thereon. Connected respectively with the sprockets 84 and 88 are gears 126 and 128 which mesh respectively with gears 130 and 132 secured to the shaft 112. When the shaft 112 is intermittently rotated as already stated, the sprockets 84 and 88 and the corresponding chains 92 and 96 are intermittently operated in the same directions as the chains 90 and 94. However, the two chains 92 and 96 do not necessarily always move in unison with the chains 90 and 94, the respective pairs of chains being actuated by the said separate shafts 124 and 110 either of which may be moved independently as will presently appear.

The frame element 68 carries shafts 134, 136 and 138 which are similar respectively to the shafts 70, 72 and 112. Sprocket wheels similar to those on the shafts 70 and 72 are carried by the shafts 134 and 136 and are similarly related thereto. The lower inner sprocket wheel is indicated at 140 in Fig. 8. One of the gears for driving the sprocket wheel 140 is shown at 142 in the same figure. These several sprocket wheels are spaced and driven similarly to those on the shafts 70 and 72. Extending over the sprocket wheels are chains 144, 146, 148 and 150 which are similar to the chains 90, 92, 94 and 96. The chains 144 and 148 are rotated in accordance with the rotation of the shaft 136, and the chains 146 and 150 are rotated in accordance with the rotation of the shaft 138. The shaft 138 is intermittently rotated in unison with the shaft 112 but in the opposite direction. To this end the before-mentioned shaft 118 is extended toward the left, as shown in Fig. 8, being supported near its left end by a bracket 151 on the frame element 68. Secured to the shaft 118 at the left end thereof is a bevel gear 152 which meshes with a bevel gear 153 at the rear end of the shaft 138. The shaft 136 is similarly driven in unison with the shaft 72 but in the opposite direction. To this end the shaft 102 is extended toward the left and is also supported near its left end in the said bracket 151. The left portion of the said shaft 102 is immediately below the shaft 118, as viewed in Fig. 8, and therefore is not seen. The shaft 102 is connected at its left end with the rear end of the shaft 136 by means of bevel gears similar to the bevel gears 152 and 153. The said gears connecting the shafts 102 and 136 are immediately below the gears 152 and 153, as viewed in Fig. 8, and therefore, are not seen.

Each of the interconnected chains 90, 144, 94 and 148 carries a plurality of uniformly spaced lugs 154, 154, and as shown there are two such lugs on each chain. These lugs are so arranged that four lugs of one set are always at the same level and that the four lugs of the other set are always at the same level. Preferably, each two lugs 154, 154 at each side are connected by a transverse carrier bar 156. The carriers 156, 156 of each pair are at the same level, and the two carriers constitute a carrying means for one of the before-mentioned stack plates.

Each of the interconnected chains 92, 146, 96 and 150 carries a plurality of uniformly spaced lugs 158, 158 which are similar to the lugs 154, 154. The number of lugs 158, 158 is the same as the number of lugs 154, 154 on the other chains. The lugs 158, 158 are so arranged that the four lugs of one set are always at the same level and that the four lugs of the other set are always at the same level. Each two lugs 158, 158 at each side are connected by a transverse carrier bar 160. The carriers 160, 160 of each pair are at the same level, and the two carriers constitute a carrying means for one of the before-mentioned stack plates.

The carriers 156, 156 constitute one group and the carriers 160, 160 constitute another group. The carriers in the two groups are alternately disposed. The levels of the carriers in the two groups may be changed in relation to each other, as will be described.

Two stack supporting plates 162 and 163 are provided, one being supported or adapted to be supported by one of the pairs of carriers 156, 156 on one set of interconnected chains, and the other being supported or adapted to be supported on one of the pairs of carriers 160, 160 on the other set of interconnected chains. As already stated, all of the chains are normally moved in unison and when they are so moved and when both stack plates are engaged by a pair of carriers, the two stack plates are moved upward in unison. Each plate when uppermost can be manually withdrawn transversely from its carriers. Preferably, each stack plate 162 and 163 has transversely extending reinforcing bars 164, 164 at the bottom. Each plate preferably has a downward extending flange 166 at the front to facilitate manual engagement for transverse withdrawal.

Fig. 4 shows a stack A of book components supported on the upper stack plate, which is shown as being the plate 162, this being supported on a pair of carriers 156, 156 on the interconnected chains 90, 94, 144 and 148. There is also shown a stack B of similar book components supported on the lower stack plate, which is shown as being the plate 163 adapted to be supported on a pair of carriers 160, 160 on the other interconnected chains 92, 96, 146 and 150. The stacks A and B engage at the rear with rearward inclined guide rails 168 and 170 which are supported on the longitudinal bars 18 and 20. Preferably, the guide rail 168 has a forward extending flange with which the corresponding ends of the stacks engage. The downward inclination of the stack plates 162 and 163 and the rearward inclination of the guide rails 168 and 170 serve to prevent deformation of the stacks A and B, inasmuch as gravity tends to move the stack components rearward. The rails 168 and 170 are preferably adjustable longitudinally along the bars 18 and 20 so as to be adapted to engage and guide stacks of different lengths.

By means of mechanism to be presently described, the movements of the chains and supporting bars of each stack mechanism are so regulated that the top of the stack A is always maintained substantially at a predetermined level which is slightly below the tops of the guide rails 168 and 170. Preferably, retaining means are provided for engaging the upper portion of the stack at the top and at the front to prevent any possible upward or forward movements of the book components constituting the said upper portion, and for other purposes to be set forth. Carried by the frame elements 66 and 68 at the tops thereof are transverse rails 172, 172 provided with T-slots therein. Adjustable along the said rails are blocks 174, 174, these blocks being held in adjusted positions by means of headed bolts 176, 176 entering the T-slots. Arms 178, 178 are connected with the blocks 174, 174 for pivotal movement about axes at 179, 179. The arms 178, 178 extend downward and inward and respectively carry at their lower ends normally horizontal longitudinally slotted bars 180, 180. Secured to the slotted bars 180, 180 are blocks 182, 182 which are adjustable therealong, being held in adjusted position by bolts 184, 184. Each block 182 carries a rearward projecting member 186 which is preferably cylindrical and which is positioned to engage the top of the stack A. Extending through each member 186 is a bar 188 which is positioned to engage the upper portion of the front of the stack A. Each bar 188 is longitudinally slotted, as shown in Fig. 6, and a screw 190 is provided which extends through the slot. The bar 188 is vertically movable to the extent permitted by the length of the slot therein. Ordinarily, each bar 188 is in the relative position shown in Fig. 6, but it is movable upward from the said position and relatively to the corresponding member 186 if and when it is engaged by one of the stack plates 162 or 163.

The two members 186, 186 rest on the top of the stack A and are vertically movable in accordance with minor variations in the level of the top of the stack. They apply pressure to the top of the stack near the front thereof and offer frictional resistance to the withdrawal of the successive book components therefrom. The bars 188, 188 prevent any forward movement of the upper portion of the stack A.

It will be seen that by means of the blocks 174, 174, the members 186, 186 and the bars 188, 188 can be adjusted forward or rearward in accordance with the width of the stack A. The said members 186, 186 and the said bars 188, 188 can be adjusted longitudinally along the bars 180, 180 in accordance with the length of the stack.

Control for stack mechanisms

Two similar mechanisms are provided for controlling the respective stack mechanisms, that at the right for the stack mechanism 24 being shown in detail in Figs. 10 and 11. The controlling mechanism is carried by a plate 192 which is secured to the left side of the adjacent transverse frame plate, as for instance the frame plate 12, by means of screws 193. The beforementioned shafts 110 and 124 extend through the said plate 192 and have bearings therein. Secured to the front ends of the shafts 110 and 124 are hand wheels 194 and 196, these hand wheels being indicated in Fig. 10 merely by dot-and-dash lines.

Secured to the shaft 110 adjacent the plate 192 is a ratchet wheel 197. Mounted on the shaft 110 is a rock lever 198 carrying a spring-pressed pawl 199 which engages the ratchet wheel 197. By means of a spring 200 the rock lever 198 is biased for movement in the counterclockwise direction, such movement being limited by an adjustable stop in the form of a screw 201. Secured to the shaft 124 adjacent the plate 192 is a ratchet wheel 202. Mounted on the shaft 110 is a rock lever 203 carrying a spring-pressed pawl 204 which engages the ratchet wheel 202. The two rock levers 198 and 203 are provided respectively with downward extending arms which are connected by means of a link 205. It will be seen that the rock levers 198 and 203 are movable in unison and that when they are moved in the clockwise direction, the two pawls 199 and 204 serve to turn the shafts 110 and 124 in unison in the clockwise direction.

The rock lever 198 has an arm with a lug 206 thereon which is normally engaged by the upper arm of a bell crank 208. The bell crank 208 is spring-pressed in the clockwise direction so that the said upper arm thereof is normally in the path of the lug 206. A transverse horizontal rockshaft 210 is provided which at its front end carries an upward extending arm 212. A link 214 is pivotally connected at the upper end of the arm 212 and this link is provided with a longitudinal slot into which projects a stud 216 on an arm of the rock lever 198. The shaft 210 and the link 214 are oscillated but the amplitude of oscillation is such that the rock lever 198 is not normally moved, the slotted portion of the link 214 merely moving with respect to the stud 216 without imparting any movement to the latter. As shown in Fig. 11, the rockshaft 210 is connected by a bevel gear segment 218 and a bevel gear 220 with a longitudinal shaft 222, which is omitted in Fig. 1 in order that other parts may more clearly appear. The shaft 222 carries an arm 224 having a roller 226 thereon which engages a cam groove 228 in a cam 230 on the main shaft 64. It will be seen that as the cam 230 is rotated, the arm 224 is oscillated, thus imparting oscillation to the shaft 210 and the arm 212. The shaft 222 is extended toward the left, and it is similarly connected with the shaft 210 of the mechanism at the left for controlling the left stack mechanism 26.

As shown more clearly in Fig. 7, a bracket 232 is mounted on the bar 20 adjacent the top of the corresponding stack. This bracket carries a short longitudinal rockshaft 234 to which is secured a forward extending lever 236. The lever 236 carries a stud 238 which projects between two collars 240 and 242 on a rod 244 extending parallelly with the stack mechanism. The rod 244 is reciprocable, being guided by bearings 246 and 248 on the bars 20 and 18. The rockshaft 234 has secured to it a finger 250 which is so shaped and positioned that its forward end is adapted to engage the top of the stack A, as shown in Figs. 4 and 11. The shaft 234 and the parts carried thereby are biased, by a spring or otherwise, so that the shaft tends to move in the counterclockwise direction, the finger 250 and the rod 244 tending to move downward. The aforesaid movement of the parts is limited by the engagement of the end of the finger 250 with the top of the stack A.

Suitably mounted in the machine adjacent the cam 230 is a short longitudinal rockshaft 252, as shown in Figs. 2 and 11. This shaft carries an arm 254 having a roller 256 which engages a cam groove 258 in the said cam 230. Also carried by the rockshaft 252 is a lever 260 which extends forward and upward. The lever 260 is provided at its front end with a stud 262 which is positioned to engage the lower side of a collar 264 secured to the reciprocable rod 244. It will be seen that when the cam 230 is rotated, the rockshaft 252 is oscillated, the lever 260 oscillating therewith. By reason of the stud 262 and the collar 264, the lever 260 serves to oscillate the rod 244, moving it upward from the position shown in Fig. 11 and thus swinging the finger 250 upward approximately to the position shown by dotted lines. As the rod 244 again moves downward, the finger 250 moves downward until it engages the top of the stack and further movement is thus prevented. If the top of the stack is at the normal position slightly below the tops of the guides 168 and 170, the parts are returned to the positions shown in Fig. 11. However, if the top of the stack is below its normal position, the parts move beyond the positions shown in Fig. 11. The shape of the cam groove 258 is such that the finger 250 is only momentarily engaged with the stack, the finger being held in its upper position during the major portion of the cycle.

A rock lever 266 is provided, this being mounted for oscillation about a longitudinal stud 268, as shown in Fig. 11. The lever is biased for movement in the counterclockwise direction. The rear end of the lever 266 carries an adjustable screw 272 which is adapted to be engaged by the lower end of the rod 244. The front end of the lever 266 is provided with an adjustable screw 274, the upper end of which abuts against the horizontal arm of the bell crank 208, as shown in Fig. 10. A spring 275 holds the horizontal arm of the bell crank 208 in engagement with the screw 274.

The relationship of the parts, as shown in Fig. 11, is such that the collar 264 does not engage the stud 262 when the lever 260 is in its lower position and when the top of the stack A is at its said normal level. The rod 244 in moving downward does not normally engage the screw 272 to move the lever 266. However, when the top of the stack is lowered below its normal level, the rod 244 moves downward to an extent greater than normal, and in so moving, it engages the screw 272 to move the rock lever 266 in the clockwise direction. The front end of the lever 266 then moves upward and the screw 274 thereon moves the lower arm of the bell crank 208 in the counterclockwise direction sufficiently to disengage the upper end of the said bell crank from the lug 206. When this occurs the spring 209 moves the rock levers 198 and 203 in the counterclockwise direction, such movement being limited by the stop screw 201 as already stated. Upon the next following movement of the link 214 toward the right, as viewed in Fig. 10, the rock levers 198 and 203 are moved in the clockwise direction and restored to the positions shown in Fig. 10. In so moving, the pawl 199 engages the ratchet wheel 197 to turn the shaft 110 and the pawl 204 engages the ratchet wheel 202 to turn the shaft 124. By means of the mechanisms which have already been described, the shafts 110 and 124 operate all of the chains so as to cause upward movement of the two pairs of carrier bars 156, 156 and 160, 160 which are or may be in engagement with the stack plates 162 and 163. As shown in Fig. 4, the upper plate 162 is supported by the carrier bars 156, 156 and therefore the said plate 162 moves the upper stack A upward and tends to restore the top thereof to its normal level.

When the lever 266 moves in the counterclockwise direction by reason of its spring-bias, the bell crank 208 is released, and at the end of the clockwise movement of the rock lever 198 the bell crank returns to the position shown in Fig. 10 so as to again obstruct the lug 206. If a single movement of the ratchet wheels is sufficient to restore the stack A to its normal level, the next downward movement of the rod 244 does not actuate the lever 266 and the upper arm of the bell crank 208 remains in obstructing relationship with the lug 206. However, if the top of the stack A is still below its normal level, the operation above-described is repeated until the said normal level is restored.

It will be understood that the control mechanism as described for the stack mechanism 24 is duplicated for the stack mechanism 26. The several parts of the duplicate control mechanism are operated by the said rockshafts 222 and 252.

Reference has already been made to the stack B which is supported on the lower stack plate and which consists of book components which are similar to those in the stack A. The lower stack plate is shown as being the plate 163, and this lower plate may be initially supported on stationary inclined brackets 276, 276, as shown in Figs. 1 and 4. While the components are being withdrawn from the top of the stack A, and while the plate 162 is being moved intermittently upward by the carriers 156, 156, the operator places a stack B on the lower plate 163. For the convenience of the operator in handling the stack B, the machine is preferably provided at the front with a shelf 278 which is supported on the brackets 276, 276 and can be used for jogging the components of the stack B to bring them into proper register with each other. After the components which are to constitute the stack B have been thus jogged and registered, they are placed on the plate 163, as shown in Fig. 4.

Continued movement of the chains causes the next following pair of carriers 160, 160 on the other set of interconnected chains to pick up the plate 163 from the brackets 276, 276, this plate being then moved intermittently upward at the same rate as the plate 162. When the stack A has been reduced in height to such an extent that the supporting plate therefor is in engagement with the bars 188, 188, as shown in Fig. 6, the plate 163 with the stack B thereon is moved rapidly upward so as to bring the top of the stack B into engagement with the bottom of the top plate 162. This rapid upward movement is effected manually by one or the other of the hand wheels 194 and 196. It will be clear from Fig. 10 that either shaft 110 or 124 can be freely moved by its hand wheel in the clockwise direction, the corresponding ratchet wheel merely moving past the corresponding pawl. When either hand wheel is turned, the chains of the corresponding set are advanced to effect upward movement of the carriers engaged with the lower plate. As shown, the carriers 160, 160 engaging the plate 163 are so moved by the hand wheel 194. The pawl and the ratchet wheel hold the carriers and the plate in the positions to which they are moved, retrograde movement being prevented by the worm gearing 106, 108 and 120, 122. As soon as the bottom stack B has been brought into engagement with the bottom of the top stack plate 162, as shown in Fig. 6, the said top plate 162 is manually withdrawn from its carriers 156, 156 in the forward direction, thus uniting the two stacks A and B. The rods 188, 188 prevent any forward movement of the lower portion of the stack A as the plate 162 is withdrawn. Furthermore, the members 186, 186 which are in engagement with the top of the stack, tend to prevent any upward movement of the supporting plate as it is withdrawn. As already stated, the carrier bars for the two stack plates always move in unison, except during the aforesaid manual movement of the lower plate. Therefore, the two plates and the two stacks move upward in unison after the said rapid upward movement of the lower plate and the lower stack, and they are maintained in fixed relationship even if there should be some slight delay on the part of the operator in withdrawing the upper plate.

The withdrawal of the upper plate 162 serves to slightly lower the top of the stack, but it is not lowered sufficiently to interfere with the continued removal of book components from the top thereof. Furthermore, the level of the top of the stack is promptly restored by means of the mechanism for that purpose which has already been described.

The plate 162 which has been withdrawn as above-stated, is thereupon placed on the brackets 276, 276 as shown in Fig. 4, and a new stack B is put in place of the lower plate which is now the plate 162 and not the plate 163. The plate 162 is lifted from the brackets 276, 276 by the next following pair of carriers 156, 156. When the new stack A, now on the plate 163, has been sufficiently reduced in height, the procedure previously described is repeated, the plate 162 again becoming the upper plate and the plate 163 again becoming the lower plate.

It will be understood that the stack plate 162 is always supported and moved by the pairs of carriers 156, 156 of one set and that the other plate 163 is always supported and moved by the pairs of carriers 160, 160 of the other set. The said sets of carriers are moved respectively by the different sets of interconnected chains, one set of chains being operable by the hand wheel 194 and the other set of chains being operable by the hand wheel 196. It is therefore necessary for the operator to effect the rapid upward movement of the successive lower plates, first by means of one of the hand wheels, and then by means of the other of the hand wheels.

*Lifting mechanisms*

Associated with each of the stack mechanisms, 24 and 26 is a mechanism for lifting the rear portions of successive single sheets or book components from the top of the stack A to a position above the tops of the guides 168 and 170 where they can be readily engaged and moved rearward by the transfer mechanism to be presently described. In the description of the lifting mechanism, reference will be had particularly to Figs. 4, 7 and 13. The lifting mechanisms for the two stack mechanisms are identical in construction and the description can be regarded as applying primarily to the mechanism at the right.

Two longitudinally spaced slides 280, 280 are provided, these slides being movable in brackets 282, 282 secured to the rear of the longitudinal bar 20. The slides 280, 280 are movable in an inclined direction corresponding to the inclination of the stack mechanism. Secured to the slides 280, 280 at the top thereof is a longitudinal horizontal bar 284 having a longitudinal T-slot in the top thereof.

A longitudinal shaft 286 is provided, as shown in Fig. 13, and this shaft carries two arms 288 which are provided at their forward ends with rollers, the said rollers being entered in transverse notches in the respective slides 280, 280. A longitudinal shaft 290 is provided on which is pivoted a lever 292, the said lever being connected by means of a link 294 with one of the arms 288 on the shaft 286. The lever 292 carries a roller 296 which is entered in a cam path 298 in the left side of the gear 62. The shape of the cam path is such that the lever 292 is oscillated, the lever causing the oscillation of the arms 288, and the arms in turn causing the reciprocation of the slides 280, 280 and of the longitudinal bar 284.

Mounted on the bar 284 are blocks 300, 300. The number of blocks may be varied but three are shown. These blocks 300, 300 are adjustable along the bar 284, being held in adjusted positions by means of bolts entering the T-slot in the top of the bar. Each block 300 is provided with an arm 302 which extends downward and forward, and a pipe 304 is mounted at the lower end of each arm. Each pipe 304 carries a vacuum cup 306 in position for engagement with the top component of the corresponding stack A.

Carried by suitable brackets on the bar 284 is a longitudinal pipe 308 provided with upward projecting nipples 310, 310. Flexible hose connections 312, 312 are provided between the respective pipes 304, 304 and corresponding nipples 310. As shown there are four nipples 310 and it will be understood that when only three vacuum cups are provided one of the nipples will be closed, as for instance by means of a suitable cap.

Connected with one end of the pipe 308, as for instance the right end, is a flexible hose 314 which extends to a valve mechanism 316 as shown in Figs. 1 and 20. The valve mechanism 316 is mounted upon and is operated by the main shaft 64 and a hose 318 connects the valve mechanism with a suitable vacuum pump which is not shown. The details of the valve mechanism do not constitute a part of the present invention and they are not shown. It is sufficient to state that the valve mechanism serves during a requisite portion of each cycle to connect the hoses 314, 314 for the two lifting mechanisms with the hose 318 so that during such portion of the cycle vacuum is applied at the vacuum cups 306, 306.

The shape and timing of the cam path 298 is such that the vacuum cups 306, 306 are reciprocated between the positions shown by full lines and by dotted lines in Fig. 13. When the vacuum cups are in the dotted line positions vacuum is applied thereto by the valve mechanism 316 and the vacuum cups thus engage the top component C in the stack A. The vacuum in the cups is maintained until the component C is lifted to the position shown by full lines in Fig. 13, whereupon the component is engaged by the transfer mechanism to be presently described. As soon as the component is engaged by the transfer mechanism, the vacuum in the cups 306, 306 is released and after the component has been moved reardward by the transfer mechanism the vacuum cups are moved to the dotted line positions to engage the next following top component in the stack A.

Preferably, one or more nozzles 319 are provided for delivering a jet or jets of air against the components at the top of the stack A. Thus the top components are riffled to insure that only one of them will be picked up and lifted by the vacuum cups 306, 306.

As already stated, the blocks 300, 300 are adjustable along the bar 284. This makes it possible to adjust the positions of the vacuum cups 306, 306 in accordance with the width of the components being handled.

When one of the book components is a signature comprising a plurality of folded sheets, it is particularly important to first lift each successive component and then transfer it rearward by means of a transfer mechanism which grips the entire signature. It has heretofore been proposed to transfer single sheets from a stack by means of a transversely movable vacuum cup. While a transversely movable vacuum cup may be satisfactory for single sheets, it is not suitable for a signature comprising a plurality of sheets. A vacuum cup will lift such a signature, but if the vacuum cup were to be moved transversely it would frequently, if not in fact always, transfer only the outer sheet of the signature, this outer sheet being separated from the other portions of the signature. With the present construction the vacuum cup serves only to lift the signature without moving it transversely. The signature is lifted into position for engagement by a separate transfer means which grips the signature so that all of the sheets thereof are held in fixed relationship and are transferred in unison.

*Transfer mechanisms*

As already stated, a transfer mechanism comprising transfer units 28, 28 is associated with the stack mechanism 24, and a transfer mechanism comprising transfer units 30, 30 is associated with the stack mechanism 26. The two transfer mechanisms and the four transfer units are similar in construction. Inasmuch as the construction of all four of the units is the same, a description of one of them will suffice and the description can be understood as applying to the right unit 28 of the transfer mechanism for the right stack mechanism 24. One transfer unit and the operating mechanism for all of them are shown in Figs. 2, 13, 14, 15 and 16.

The before-mentioned shelves 34 and 36 are located immediately at the rear of the stack mechanisms, and these shelves are inclined downward and rearward as shown in Figs. 2 and 13. Preferably, the shelves are not perpendicular to the stack mechanisms but are inclined additionally downward and rearward. The rear portion of the lower shelf 34 extends into a longitudinal notch in the bar 22 and the forward face 320 of the notch constitutes a stop and longitudinal guide for the rear edge of a component on the lower shelf 34. A longitudinal bar 321 is secured to the bar 22 with its forward face in register with the forward face 320 of the notch in the bar 22. The said forward face of the bar 321 constitutes a stop and longitudinal guide for the rear edge of a component on the upper shelf 36.

Each transfer unit comprises a transversely reciprocating means including two opposed jaws engageable with the upper and lower faces of the successive lifted book components C adjacent the rear edges of the said components. Each transfer unit also comprises means for relatively moving the jaws to cause them to engage the components near the end of forward movement and to cause them to release the components near the end of rearward movement.

More specifically, each transfer unit comprises a slide housing 322 which is carried by the main longitudinal bars 22 and 23 which are at the rear of the shelves and constitute supporting means for the transfer units. The slide housing 322 has a gib 323 which enters a longitudinal groove in the bar 23, and the slide housing is connected with the longitudinal bar 22 by means of bolts 324 which have threaded engagement with T-blocks 326 which are entered in a longitudinal T-slot in the said longitudinal bar 22. By loosening the bolts 324, the slide housing can be adjusted along the bars.

A slide 328 is provided which is guided within the housing 322 for movement longitudinally of the housing and transversely of the machine. The parts are so positioned that the slide 328 moves parallelly with the shelves 34 and 36, the bottom of the slide being close to the plane of the upper face of the upper shelf. A rack 330 is provided at the bottom of the slide 328 and this rack meshes with a pinion 332 on a longitudinal shaft 334. The pinion 332 is keyed to the shaft 334 but can be moved longitudinally with respect thereto in accordance with longitudinal adjustment of the corresponding slide housing 322. In order that the pinion may move with the slide housing, the latter is provided with depending brackets 333 which are positioned at the respective sides of the pinion. The shaft 334 is mounted in bearing blocks 336 secured to the main cross plates 12, 14 and 16. Secured to the shaft 334 at the extreme right end thereof is a pinion 338, as shown in Fig. 2. This pinion meshes with a gear segment 340 which is at the right of the right cross plate 12 and which is pivoted to the said cross plate by means of a suitable shaft or stud 342. The main shaft 64 carries at the extreme right end thereof a crank 344 and this crank is connected by means of a link 346 with the said segment 340. It will be seen that as the shaft 64 is rotated, the crank 344 and the link 346 serve to oscillate the gear segment 340 through one cycle. Oscillation of the segment 340 serves to rotate the pinion 338 and the shaft 334 alternately in opposite directions and the shaft 334 serves by means of the pinion 332 and the rack 330 to reciprocate the slide 328. It will be observed that, inasmuch as the slide 328 is reciprocated by a crank, the speed thereof changes. The slide moves relatively rapidly when in mid-position and relatively slowly at the ends of the reciprocation. The reciprocation is so timed that the slide is at its forward upper position, as shown in Figs. 13 and 14, when the top sheet C has been lifted by the vacuum cups 306, 306, as already explained.

As has been stated, each transfer unit is provided with a gripping mechanism generally indicated at 32. This gripping mechanism comprises a lower jaw 348 which may be formed integrally with the slide 328, and it also comprises an upper jaw 350 which is pivoted to the slide for movement about a horizontal axis at 352. A spring 354 biases the upper jaw 350 for downward movement. A stop 355 is provided for properly positioning the edge of each component C with respect to the jaws. For controlling the relative movement of the upper jaw 350 to grip or release the sheet or component C, there is provided a member or slide 356 which normally moves with the slide 328 because of frictional engagement therewith, but which can also be moved longitudinally relatively thereto. The slide 356 has an inclined front face at 358 which is adapted to engage a roller 360 on the pivoted upper jaw 350. Figs. 13 and 14 show the slide 356 so positioned that the inclined front face 358 thereof is out of engagement with the roller 360, the upper jaw 350 having been moved by the spring 354 into gripping engagement with the sheet or component C.

A slide 362 is located within the slide housing 322 at the bottom thereof near the rear. This slide is longitudinally reciprocable through a short distance. It has upward projections 364 and 366 which are adapted to engage with a downward projection 368 carried by the slide 356 at the rear thereof.

In order that it may be reciprocated, the slide 362 is provided at the bottom with a rack 370 which meshes with a gear segment 372 on a longitudinal shaft 374. The shaft 374 is mounted in bearing blocks 376 secured to the longitudinal bar 23. The gear segment 372 is keyed to the shaft 374 but can be moved longitudinally with respect thereto in accordance with longitudinal adjustment of the corresponding slide housing 322. In order that the segment may move with the slide housing, the latter is provided with depending brackets 378 which are positioned at the respective sides of the segment.

Mounted on the aforesaid shaft 290 is a bell crank 380, one arm of which carries a roller 382 which is entered in a cam path 384 at the right side of the gear 62. The other arm of the bell crank 380 is connected by means of a link 386 with an arm 388 secured to the shaft 374. It will be seen that as the shaft 64 is rotated, the bell crank 380 and the link 386 serve to oscillate the arm 388, the shaft 374 and the gear segment 372. Oscillation of the gear segment serves to reciprocate the slide 362.

When the jaws 350 and 348 have been engaged with a component C, as shown in Figs. 13 and 14, the slide 328 is moved rearward and downward carrying the component with it. Immediately before the slide reaches the approximate position shown in Fig. 15, the projection 368 on the slide 356 comes approximately into engagement with the projection 364 on the slide 362. However, at this time the slides 328 and 356 are moving relatively slowly as the crank 344 is approaching a dead center position. On account of the relatively slow motion, engagement of the projection 368 with the projection 364 would effect only very slow relative forward movement of the slide 356. In order that the said slide 356 may be given a rapid forward and upward movement, the timing of the slide 362 is such that it rapidly moves relatively forward and upward at or about the time that the two projections 368 and 364 come into engagement. The movement of the slide 362 thus causes the slide 356 to move rapidly upward and forward so as to force the inclined front face 358 against the roller 360 and so as to move the jaw 350 upward and release the component C.

In order to more definitely assure disengagement of the component C from the jaws 348, each transfer unit is preferably provided with a stop or stripper 389 for engaging the component to stop the movement thereof before the jaws reach their limit of downward movement. Preferably each stripper 389 comprises two parts at opposite sides of the jaws and the said parts are provided with notches 389ª for receiving the said component C. The two said parts of the stripper are pivoted at 389ᵇ to the housing 322, and the said parts are connected with each other by a cross bar 389ᶜ. A cam block 389ᵈ is secured to the cross bar 389ᶜ by means of a screw 389ᵉ. Springs 389ᶠ tend to move the stripper in the clockwise direction, such movement being limited by an adjustable stop screw 389ᵍ. A roller 389ʰ is carried by the slide 328; this roller being positioned for engagement with the cam block 389ᵈ when the slide reaches the position shown in Fig. 15.

As soon as the component C is released by the jaws 348 and 350, it is engaged by the stripper 389 as shown in Fig. 15. The stripper stops the downward and rearward movement of the component, but the jaws continue their downward and rearward movement. As shown in Fig. 15, the jaws are near the limit of their downward and rearward movement but have not quite reached such limit. When the parts are in the positions shown in Fig. 15, the component C is free to move downward by gravity so as to be disengaged from the notches 389ª in the stripper 389. When disengaged from the said notches, the component can further move downward and rearward by gravity either onto the shelf 34 or onto the shelf 36.

As stated, the jaws 348 and 350 as shown in Fig. 15 have not quite reached their limit of downward and rearward movement. The said jaws are carried by the slide 328, and the said slide and the said jaws move to a position slightly beyond the positions shown. As they so move the roller 389ʰ engages the cam block 389ᵈ to rock the stripper 389 to a small extent in the counterclockwise direction. The rocking movement serves to positively move the lower edge of the component C in the downward and forward direction so as to definitely insure the disengagement thereof from the notches 389ª and so as to definitely prevent re-engagement thereof with the jaw 348. As soon as the slide 328 and the jaws start their next movement in the upward and forward direction, the stripper is restored by the springs 389ᶠ to the position shown in Fig. 15.

After the component C has been disengaged from the jaws in the manner which has been described in detail and after the jaws and the slide 328 have reached their limit of downward and rearward movement, the said slide and jaws and also the slide 356 are moved forward and upward. The slides 328 and 356 remain in fixed relationship with each other so that the jaw 350 remains separated from the jaw 348. The parts reach the approximate positions shown in Fig. 16 with the jaws separated and positioned to embrace the next following component C. When the parts are in the approximate positions shown, the projection 368 on the slide 356 is in engagement with the projection 366 on the slide 362. However, at this time the slides 328 and 356 are moving relatively slowly as the crank 344 is again near or at a dead center position. On account of the relatively slow motion of the slides 328 and 356, engagement of the projection 368 with the projection 366 would effect only very slow relative rearward movement of the slide 356. In order that the said slide 356 may be given a rapid rearward and downward movement, the timing of the slide 362 is such that it moves relatively rearward and downward at or about the time that the two projections 368 and 366 come into engagement. The movement of the slide 362 thus causes the slide 356 to move rapidly rearward and downward so as to withdraw the inclined front face 358 from beneath the roller 360 and so as to permit the jaw 350 to be moved by the spring 354 into engagement with the next following component C. The timing is such that the jaw 350 is released to engage the component C when the parts have moved beyond the position shown in Fig. 16, the jaws when engaging the component being in the same positions as shown in Fig. 14. With the jaws engaged with the next following component C, the slides 328 and 356 again move rearward as already described.

As already stated, the transfer units are longitudinally adjustable along the bars 22 and 23. By reference to Fig. 12, it will be apparent that the transfer units of each pair are preferably spaced uniformly from the center line of the components being transferred and near the end edges of the said components. When components of different lengths are to be handled the positions of the transfer units are changed accordingly.

*Assembling mechanism*

In describing the assembly mechanism, reference will be had primarily to Figs. 12, 17, 18 and 19, but with incidental references to other figures. Only two stack mechanisms are shown and only two superposed shelves are shown for receiving components from the stack mechanisms. When there are only two stack mechanisms and only two shelves, the components are withdrawn from the stack mechanisms and assembled on the shelves in groups of two or in pairs. The invention is not limited to the withdrawing and assembling of pairs of components, and larger groups may be withdrawn and assembled by providing a larger number of stack mechanisms and a larger number of shelves.

The before-mentioned lower shelf 34 extends from end to end of the machine, and it has a slot 390 extending throughout the entire length thereof, the result being that the shelf comprises two separate longitudinal portions separated from each other by the slot. The forward wider portion of the shelf 34 is supported directly on the transverse plates 12, 14 and 16 and may be additionally supported on brackets 392 secured to the longitudinal bar 20 as shown in Fig. 20. The rear narrower portion of the shelf 34 is supported directly on the longitudinal bar 22, as shown in Figs. 13 and 14.

The upper shelf 36 is parallel with the shelf 34 and is spaced a short distance above it. The upper shelf 36 is relatively short and it is positioned directly behind the left stack mechanism 26. The upper shelf 36 has a slot 394 extending throughout the entire length thereof, the result being that the shelf comprises two separate longitudinal portions separated from each other by the slot. The slot 394 is in register with the slot 390. The upper shelf 36 is supported at the right by means of a transverse bar 396 which is conected at its ends with the longitudinal bars 20 and 22. The shelf is supported at its left end near the front by a suitable bracket which is not shown. The lower shelf 34 has a right or first end portion which extends or projects beyond the right end of the upper shelf 36 and it has a left or second end portion which extends or projects beyond the left end of the said upper shelf 36. The said projecting portions of the lower shelf are upwardly exposed for the reception of book components.

Figure 12:
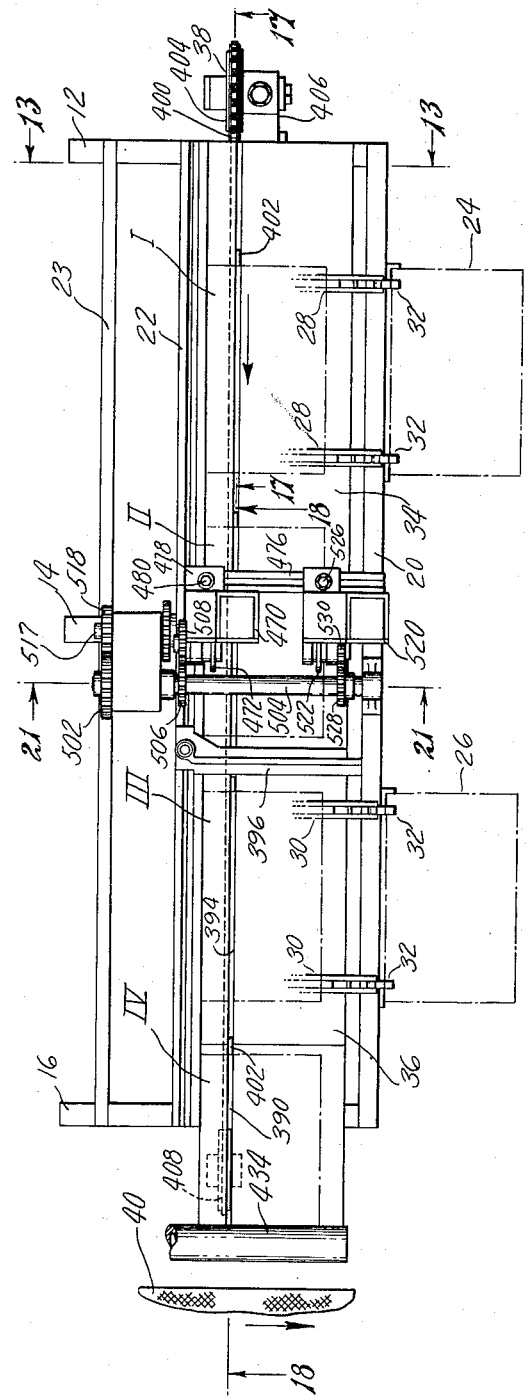
Fig. 12 is a fragmentary plan view taken in the direction of the arrows 12, 12 in Fig. 2, the bottom of the view being toward the front of the machine and the view showing principally the means for supporting, moving and pasting the book components and omitting many other parts.

The transfer mechanism 28 successively transfers a series of single components C from the stack in the stack mechanism 24 to a predetermined position I on the first projecting end portion of the lower shelf 34, as shown in Fig. 12. The transfer mechanism 30 successively transfers a second series of single components D from the stack in the stack mechanism 26 to a predetermined position III on the upper shelf 36 as shown in Fig. 12. Figs. 17 and 18 show the components in positions I-A and III-A which are toward the left from the positions I and III. It will be observed that the two said predetermined positions I and II are at different levels. Preferably, the two transfer mechanisms operate simultaneously. As already stated, the invention is not limited to the handling and assembling of signatures and end sheets, but when it is to be so used the components of the first series transferred to the first projecting end portion of the lower shelf may be book signatures, and the components of the second series transferred to the upper shelf may be folded end sheets. However, the invention is not limited to the relationship stated and the positions of the signatures and the end sheets may be reversed. When one of the components is an end sheet, whether on the upper shelf or on the lower shelf, the said sheet is preferably folded and placed, as indicated in Fig. 19, so that the portion thereof which is separated from the signature projects forward beyond the other portion thereof which is adjacent the signature. The reason for this will be fully explained.

Means is provided for engaging successive transferred components C or D of one of the said series and for effecting relative longitudinal movement between pairs of components in the two series so that they are in superposed face-to-face register with each other. Preferably and as shown, the said means engages the components C of the first series to move them from the position I to the position III and into face-to-face register with the transferred components D of the second series. Inasmuch as the shelf 34 is below the shelf 36, each component C is moved to a position below the position of the corresponding component D at III.

Before the components come into face-to-face register at the position III one of them may be pasted along a zone on the face thereof which is toward the other component. Preferably, the lower component C, which may be the signature, is pasted along a zone on the upper face thereof, such pasting being effected as the signature moves along the first projecting end portion of the lower shelf through the intermediate position II as shown in Fig. 12. Fig. 18 shows a component C in the position II-A at the left of the position II. The pasting mechanism is indicated generally at 399, and this will be more fully described.

Inasmuch as the two transfer mechanisms operate simultaneously, each component C of the first series is moved into register with a later component D of the second series. In fact, when a pasting means such as 399 is interposed between the two predetermined positions, each component C of the first series is moved into register with the second following component D of the second series. It will be observed that the pasting means 399 acts upon a component of the first series while the next following component of the same series is being moved to its said predetermined position and while the next preceding component of the same series is being moved into register with a component of the second series.

The two components, that is, the signature and the end sheet, are moved in unison out of position III so that the upper component moves off from its shelf and into engagement with the lower component. When one of the components has been pasted adherence is thus effected along the zone of pasting. Preferably, the two components are moved out of position III in the longitudinal direction to a position indicated at IV in Fig. 12 where they are in engagement with each other. Fig. 18 shows the components in the position IV-A at the left of the position IV.

The means for longitudinally moving the components is preferably an endless chain 400 having a plurality of uniformly spaced pushers 402, 402 thereon, these pushers being so arranged that they extend upward through the slots 390 and 394. The chain 400 extends at the right end of the machine around an idler sprocket 404 mounted on a bracket 406 secured to the right transverse plate 12. The chain 400 extends at the left end of the machine around a power driven sprocket 408 mounted on a bracket 410 secured to the left transverse plate 16. The transverse plates 12, 14 and 16 are provided with openings 412, 412 to permit the passage of the lower run of the chain. The sprocket 408 is connected with a shaft 414 which carries a bevel gear 416. The bevel gear 416 meshes with a bevel gear 418 on a shaft 420 rotatable in bearing brackets secured to the left transverse plate 16 as shown in Fig. 3. A bevel gear 422 at the lower end of the shaft 420 meshes with a bevel gear 424 on the left end of the main shaft 64. By means of the power connections described, the chain is continuously driven.

The upper run of the chain 400 is guided between two parallel longitudinal rails 426 and 428 as shown in Figs. 13, 18 and 21. The two rails are located in notches in the transverse plates 12, 14 and 16 and the upper rail 428 engages the bottom of the lower shelf 34.

Immediately upon transfer of a signature C to the position I, one of the pushers 402 engages the said signature to move it toward the left from the position I to the successive positions II, III and IV. As each signature C reaches the position III it comes into face-to-face register with an end sheet D on the upper shelf 36 and the signature and the end sheet are then moved in unison by the same pusher 402. At the intermediate position II the signature is pasted along a zone adjacent one edge by the pasting means 399. It will be observed that each signature C comes into register at the position III with an end sheet D which has been transferred during the second following cycle. Continued movement of the signature and the end sheet beyond position III causes the end sheet to pass beyond the end of the upper shelf 36 and the end sheet and the signature are thus caused to engage each other so as to effect adherence along the zone of pasting. Before they reach the position IV they are fully engaged.

When pasting means are provided, the adhering signature and end sheet are engaged beyond position IV in the bite between two pressure rollers 432 and 434 which press them together to cause more effective adherence. The rollers 432 and 434 are carried by brackets 435 and 436 extending toward the left from the left transverse plate 14. As the adhering signature and end sheet emerge from the rollers 432 and 434 they are deposited on the belt 40 which moves them toward the front of the machine.

The mechanism for driving the rollers 432 and 434 is shown in Figs. 3 and 18. A gear 437 is secured to the shaft 414 which operates the chain 400, and this gear meshes with a pinion 438 on a shaft 440. The shaft carries a gear 442 which meshes with a gear 444 connected with the lower roller 432. The roller 432 drives the roller 434 by means of intermeshing gears, the upper gear 446 being shown in Fig. 3. The gearing ratio is such that the rollers 432 and 434 are operated at a relatively high speed, the result being that as soon as the signature and end sheet are engaged by the rollers they are moved relatively rapidly toward the left out of engagement with the corresponding pusher 402. This causes them to move out of the path of the pusher 402 as it swings downward around the sprocket 408.

Preferably, in order that the machine may be adapted for relatively short signatures and end sheets, the rollers 432 and 434 are positioned close to the end of the chain. The position of the rollers is such that the lower roller 432 is in the path of the pushers 402 and in order to provide clearance for the pushers, the said roller 432 is provided with an annular groove 448, as indicated in Figs. 3 and 18.

The conveyor 40 for moving the assembled and adhering signatures and end sheets forward is an endless belt which passes over front and rear rollers mounted respectively in brackets 450 and 452 secured to the left transverse plate 16, as shown in Fig. 3. The front roller for the belt 40 is mounted on a shaft 454 which carries a ratchet wheel 456 as shown in Fig. 1. Mounted on the shaft 454 is an oscillating arm 458 which carries a pawl engaging the ratchet wheel 456. A bell crank 460 is mounted on a stud 462 projecting from the end transverse plate 16. One arm of the bell crank 460 carries a roller 464 which is engageable with a cam 466 on the extreme left end of the main shaft 64. As the shaft 64 rotates, the cam 466 oscillates the bell crank 460. The other arm of the bell crank 460 is connected by a link 468 with the arm 458, the said arm being thus caused to oscillate with the bell crank 460. As the arm 458 is oscillated, the pawl thereon engages with the ratchet wheel 456 on the roller for the belt 40, thus causing the belt 40 to move intermittently with the upper run thereof moving in the forward direction. The assembled and pasted signatures and end sheets discharged from the rollers 432 and 434 onto the belt 40 are thus moved toward the front of the machine. The assembled and pasted signatures and end sheets can be discharged into a suitable receptacle or onto another conveyor, or they can be removed manually from the belt 40.

*Pasting mechanism*

As already stated, the machine is preferably provided with mechanism for pasting one component of each pair along definite zones so as to effect adherence, but the machine may be used for merely assembling or collating book components without pasting them, and when pasting is not required the pasting mechanism may be omitted. While the pasting mechanism may be omitted, it is ordinarily provided, and will be described with particular reference to Figs. 12 and 20 to 26.

The pasting mechanism includes a pasting unit having a paste box 470 and having a pasting disc 472. The pasting disc is mounted on a shaft 474 carried by the box, the disc fitting a slot in the box so as to come into contact with paste in the interior thereof. The sides of the slot closely fit the disc to prevent any substantial quantity of paste from adhering to the sides of the disc, but clearance is provided between the end of the slot and the periphery of the disc so that as the disc is rotated the periphery thereof carries a thin layer of paste. The box 470 is so located that the disc 472 engages a signature or end sheet C on the lower shelf 34 as it moves through position II, the location being such that the signature or end sheet is pasted along a longitudinal zone closely adjacent the lower rear edge thereof. A transverse bar 476 extends transversely above the shelf 34 and the box 470 of the pasting unit is provided with a bracket 478 which serves to support the unit on the bar. Preferably, the bar 476 has a T-slot therein and the pasting unit is adjustable along the bar to a limited extent. It can be held in adjusted position by means of a bolt 480 entering the T-slot.

For rotating the pasting disc 472 a bevel gear 482 is secured to the main shaft 64, this bevel gear meshing with a bevel gear 484 on a shaft 486 mounted in brackets 488 and 490 secured to the central transverse plate 14. Secured to the upper end of the shaft 486 is a bevel gear 492 which meshes with a bevel gear 494 secured to a short transverse shaft 496. At the rear end of the shaft 496 is a gear 498 which meshes with an idler gear 500. The idler gear 500 meshes with a gear 502 secured to the rear end of a transverse shaft 504. The shaft 504 carries a gear 506 which meshes with a gear 508 secured to the shaft 474 which is mounted on the paste box 470 and which carries the pasting disc 472. The gear 506 is adjustable along its shaft in accordance with the adjustment of the pasting unit along the transverse bar 476. The pasting disc is rotated at such a speed that its periphery has the same speed as that of the component C as it is moved by the corresponding pusher 402.

Preferably, two rollers 510 and 511 are provided for cooperating with the pasting disc 472 to insure firm contact of the pasting disc with the signature or end sheet to be pasted. The lower shelf 34 is provided with a notch at the rollers 510 and 511 in order that the said rollers may directly engage with the signature or end sheet. Each of the rollers 510 and 511 is mounted on a short transverse shaft which is rotatable in a bearing block 512. The said shafts carry at their rear ends gears 513 and 514, both of which mesh with a gear 516 on a short transverse shaft 517. The shaft 517 carries a gear 518 which meshes with the gear 502 on the shaft 504. Thus the rollers 510 and 511 are rotated, the direction and speed of rotation being such that the peripheral speed of the rollers is the same as the speed of the signature or end sheet as it is moved by the corresponding pusher 402. The rollers 510 and 511 are of sufficient width to take care of any transverse adjustment of the pasting unit.

Preferably, a second pasting unit is provided, this unit having a paste box 520 which is generally similar to the paste box 470 although differently shaped. The second pasting unit has a pasting disc 522 mounted on a shaft 524. The paste box 520 of the second pasting unit is secured to the transverse bar 476 by a T-bolt 526 and it is positioned near the front of the shelf 34. The second pasting unit is adjustable along the bar 476 so as to be positioned to apply paste to the signatures or end sheet C near the front edges thereof. Inasmuch as the signatures or end sheets C may vary widely in width, the second pasting unit has a relatively extensive range of adjustment. The pasting disc 522 of the second pasting unit is rotated by means of a gear 528 on the shaft 504, this gear meshing with a gear 530 on the shaft 524 which carries the pasting disc. The gear 528 is adjustable along the shaft 504 in accordance with the transverse adjustment of the pasting unit.

The second pasting unit is preferably provided with means for interrupting the action of the pasting disc so that the corresponding zone of pasting on each component is shorter than the said component. To this end the said unit is preferably so constructed and supported that the pasting disc 522 thereof is normally out of engagement with a signature or end sheet C being moved along the shelf 34. The pasting disc 522 does not apply paste to the signature or end sheet along a continuous longitudinal zone, but merely applies paste at one or more selected very short zones. In order that each signature or end sheet C may be pasted at least at one selected short zone, a movable finger 532 is provided, as shown in Fig. 21. The finger 532 projects upward through a hole in the shelf 34 and it is carried by an arm 534 which is pivotally mounted at 536. The top of the finger 532 is normally flush with the top face of the shelf 34 and the finger is moved intermittently upward to the position shown in Fig. 21 to effect pasting at a selected short zone.

For operating the finger 532 a cam 538 is mounted on the main shaft 64, this cam having one or more projections 540. The cam 538 is connected with the shaft by a suitable means such as a set screw, not shown, and it may be rotatively adjusted relatively to the shaft. A transverse rockshaft 542 is provided, this rockshaft carrying an arm 544 having a roller 546 which is in the path of rotation of the projection 540 on the cam 538. The shaft 542 is also provided with an arm 548 which is connected by a link 550 with the arm 534 carrying the finger 532. It will be seen that as the cam 538 is rotated, the projection 540 thereon engages the roller 546 to oscillate the arm 544, thus oscillating the shaft 542 and the arm 548 to move the arm 534 and the finger 532 momentarily upward. When the finger 532 is moved upward it pushes the signature or end sheet C upward against the pasting disc 522 to cause pasting at a selected short zone near the front edge. By changing the length of the projection 540 on the cam 538 or by changing the relative rotative position of the cam, the lengths and the positions of the short zones of pasting may be changed. By providing two or more projections 540 on the cam, two or more short zones of pasting may be provided on each component. If it be assumed that a signature C is being pasted, the signature later adheres only to the rearward projecting top portion of the end sheet D as shown in Fig. 19. Thus the outer portion of the end sheet is pasted to the signature, but inasmuch as the pasting is near the edge, it is later trimmed off prior to the completion of the book to eventually leave the outer portion of the end sheet free from the adjacent signature.

*Summary of operation*

In preparing the machine for operation, various parts thereof are positioned or adjusted in accordance with the size of the particular book components to be handled. It will be assumed in the following description that the book components are signatures and end sheets. In each stack mechanism one or both of the rails 168 and 170 are adjusted longitudinally of the machine to the extent necessary. The blocks 182, 182 are adjusted longitudinally so as to bring the bars 188, 188 into positions which are equally spaced from the ends of the signatures and end sheets. The vacuum cups 306, 306 are adjusted longitudinally in accordance with the length of the signatures and end sheets, and for very long signatures and end sheets four vacuum cups may be used. The blocks 174, 174 are adjusted transversely along the rails 172, 172 in order to bring the bars 188, 188 into engagement with the front faces of the stacks of signatures and end sheets. The units comprising the transfer mechanisms 28 and 30 are adjusted so that the two units of each mechanism are equally spaced from the center lines of the corresponding signatures or end sheets.

When the necessary adjustments have been made, a stack A of signatures is placed on the upper supporting plate of one stack mechanism, and a stack A of end sheets is placed on the upper supporting plate of the other stack mechanism. Ordinarily, the signatures are placed in the right stack mechanism 24 and the end sheets are placed in the left stack mechanism 26. The signatures and end sheets are placed with their folds at the rear, as indicated in Fig. 19. Care must be taken to make certain that the signatures and end sheets are properly positioned so that they will be located in proper relationship to each other after assembly. In the case of the end sheets, it is important that the longer portion be positioned at the top, as shown in Fig. 19.

Other stacks B, B of signatures and end sheets are placed on the lower supporting plates of the stack mechanisms and the stack mechanisms are operated in the manner that has been described in detail so that there is a continuous supply of signatures and end sheets at the tops of the two stacks A, A.

By means of the vacuum cups 306, 306 and the parts associated therewith, single signatures are successively lifted from the top of the right stack A, and single end sheets are simultaneously lifted from the top of the left stack A. By means of the transfer mechanisms 28 and 30, the lifted signatures and end sheets are simultaneously engaged and transferred rearward, the signatures being successively placed in position I on the lower shelf 34, and the end sheets being successively placed in position III on the upper shelf 36. Immediately upon the placement of a signature in position I, the said signature is engaged by one of the pushers 402 on the chain and the signature is moved along the shelf 34 toward the left and it is pasted in the manner already described as it moves past position II. The pasting means serves to apply paste along a continuous zone immediately adjacent the rear edge of the signature adjacent the fold, and the pasting means preferably also applies paste along a short zone immediately adjacent the front edge of the signature. As each signature is moved by the corresponding pusher 402 into position III, it comes into face-to-face register with an end sheet on the upper shelf 36 and the same pusher 402 then moves both the signature and the end sheet in unison toward the left. As the end sheet passes off from the relatively short upper shelf, it engages the corresponding signature and adherence is effected along the zones of pasting. Inasmuch as the upper portion of the end sheet projects forward beyond the lower portion, the adherence at the front is between the signature and the said upper portion of the end sheet. By reason of the inclination of the shelves, the signatures and end sheets are held by gravity against the guides at the rear of the shelves and are thereby maintained in proper relationship with each other.

Continued movement of the adhering signatures and end sheets toward the left causes them to be engaged between the pressure rollers 432 and 434, and inasmuch as these rollers are rotated relatively rapidly, they serve not only to press the sheets together to assure proper adherence, but also serve to move the sheets rapidly toward the left onto the conveyor 40. The upper run of the conveyor 40 moves toward the front and thus the pasted and assembled signatures and end sheets are moved toward the front of the machine. The signatures and end sheets can be discharged from the conveyor 40 into a suitable receptacle or onto another conveyor, or they can be manually removed from the conveyor 40.

In the operation as described, the signatures are placed in the right stack mechanism and the end sheets are placed in the left stack mechanism. However, this is not essential, and if desired the positions may be reversed with the signatures in the left stack mechanism and with the end sheets in the right stack mechanism. With this arrangement the end sheets are transferred to the lower shelf 34 and it is the end sheets and not the signatures that are pasted. It will be obvious that with this arrangement the end sheets must be reversed from the position shown in Fig. 19, the projecting portion of the end sheets being at the bottom rather than at the top. With the positions of the signatures and end sheets reversed as set forth, the operation of the machine is essentially the same as already described and repetition is unnecessary.

What I claim is:

1. In a machine for assembling book components, the combination of two holders for stacks of components longitudinally spaced at the front, two closely spaced superposed longitudinally extending parallel shelves adjacent the holders and at the rear thereof, the lower shelf having first and second portions respectively projecting longitudinally in opposite directions beyond the upper shelf, two simultaneously acting means for lifting successive single components from the tops of the respective stacks, a supporting means at the rear of the shelves, at least two simultaneously acting component transfer units additional to and separate from the lifting means and mounted solely on the said supporting means and so located that at least one unit is in transverse register with one holder for a stack of components and with the first projecting portion of the lower shelf and so located that at least one unit is in transverse register with the other holder for a stack of components and with the upper shelf, each unit comprising a slide extending forwardly from the said supporting means above the plane of the upper shelf and reciprocable transversely and rectilinearly and each unit also comprising two opposed jaws on the slide near the front thereof and engageable with the successively lifted corresponding components near the rear edges thereof and each unit further comprising means for relatively moving the jaws to cause them to engage the components near the end of forward slide movement and to release the components near the end of rearward slide movement so that the components are in predetermined longitudinally spaced positions one of which is on the first projecting portion of the lower shelf and the other of which is on the upper shelf, and means for longitudinally moving the successive single components on the first projecting portion of the lower shelf into a position below the successive single components on the upper shelf to form successive pairs of components and for then moving the components of the said successive pairs in unison longitudinally out of their last said positions so that the upper component of each pair is moved beyond the said upper shelf and is thereby permitted to engage the lower component of the said pair on the second projecting portion of the lower shelf.

2. A machine for assembling book components as set forth in claim 1, wherein stops are provided for limiting rearward movement of the components, each stop being positioned to engage the corresponding component before the slide and the jaws reach the end of their rearward movement so that each lower jaw is disengaged from the component.

3. A machine for assembling book components as set forth in claim 1, wherein stops are provided for limiting rearward movement of the components, each stop being positioned to engage the corresponding component before the slide and the jaws reach the end of their rearward movement so that each lower jaw is disengaged from the component, wherein each stop is movable and has a portion which engages the edge of the component and another portion which overlies the component, and wherein means is provided operable by the corresponding slide and serving to move the stop in the direction to cause the overlying portion thereof to move the component toward the corresponding shelf.

4. A machine for assembling book components as set forth in claim 1, wherein there are four component transfer units two of which are in register with one holder for a stack of components and with the first projecting portion of the lower shelf and two of which are in register with the other holder for a stack of components and with the upper shelf.

5. A machine for assembling book components as set forth in claim 1, wherein there are four component transfer units two of which are in register with one holder for a stack of components and with the first projecting portion of the lower shelf and two of which are in register with the other holder for a stack of components and with the upper shelf, and wherein means is provided to enable the said component transfer units to be longitudinally adjustable relatively to each other along the said supporting means at the rear.

6. In a machine for assembling book components, the combination of two holders for stacks of components longitudinally spaced at the front, two closely spaced superposed longitudinally extending parallel shelves adjacent the holders and at the rear thereof, the said shelves being inclined downwardly and rearwardly and the lower shelf having first and second end portions respectively projecting longitudinally in opposite directions beyond the upper shelf, two simultaneously acting means for lifting successive single components from the tops of the respective stacks, a supporting means at the rear of the shelves, at least two simultaneously acting component transfer units additional to and separate from the lifting means and mounted solely on the said supporting means and so located that at least one unit is in transverse register with one holder for a stack of components and with the first projecting portion of the lower shelf and so located that at least one unit is in transverse register with the other holder for a stack of components and with the upper shelf, each unit comprising a slide extending forwardly from the said supporting means above the plane of the upper shelf and reciprocable transversely and rectilinearly in parallelism with the inclined shelves and each unit also comprising two opposed upper and lower jaws on the slide near the front thereof and engageable with the successively lifted corresponding components near the rear edges thereof and each unit further comprising means for relatively moving the jaws to cause them to engage the components near the end of forward slide movement and to release the components near the end of rearward slide movement so that the components are in predetermined longitudinally spaced positions one of which is on the first projecting portion of the lower shelf and the other of which is on the upper shelf, and means for longitudinally moving the successive single components on the first projecting portion of the lower shelf into a position below the successive single components on the upper shelf to form successive pairs of components and for then moving the components of the said successive pairs in unison longitudinally out of their last said positions so that the upper component of each pair is moved beyond the said upper shelf and is thereby permitted to engage the lower component of the said pair of the second projecting portion of the lower shelf.

7. A machine for assembling book components as set forth in claim 6, wherein stops are provided for limiting downward and rearward movements of the components, each stop being positioned to engage the corresponding component before the slide and the jaws reach the end of their downward and rearward movement so that each lower jaw is disengaged from the component.

8. A machine for assembling book components as set forth in claim 6, where stops are provided adjacent the respective slides for limiting downward and rearward movements of the components, each stop being positioned to engage the corresponding component before the slide and the jaws reach the end of their downward and rearward movement so that each lower jaw is disengaged from the component, wherein each stop is movable and has a portion which engages the edge of the component and another portion which overlies the component, and wherein means is provided operable by the corresponding slide and serving to move the stop in the direction to cause the overlying portion thereof to move the component toward the corresponding shelf.

9. In a machine for assembling book components, the combination of two holders for stacks of components longitudinally spaced at the front, two closely spaced superposed longitudinally extending parallel shelves adjacent the holders and at the rear thereof, the lower shelf having first and second portions respectively projecting longitudinally in opposite directions beyond the upper shelf, two means for moving the components in the respective stacks upward to maintain the tops of the stacks substantially at predetermined levels, means at the rear of the stacks and adjacent the said predetermined levels for directing jets of air in the forward direction against the upper components in the stacks to riffle them, two simultaneously acting means including vacuum cups for engaging and lifting successive single components from the tops of the respective stacks, a supporting means at the rear of the shelves, at least two simultaneously acting component transfer units additional to and separate from the lifting means and mounted solely on the said supporting means and so located that at least one unit is in transverse register with one holder for a stack of components and with the first projecting portion of the lower shelf and so located that at least one unit is in transverse register with the other holder for a stack of components and with the upper shelf, each unit comprising a slide extending forwardly from the said supporting means above the plane of the upper shelf and reciprocable transversely and rectilinearly and each unit also comprising two opposed jaws on the slide near the front thereof and engageable with the successively lifted corresponding components near the rear edges thereof and each unit further comprising means for relatively moving the jaws to cause them to engage the components near the end of forward slide movement and to release the components near the end of rearward slide movement so that the components are in predetermined longitudinally spaced positions one of which is on the first projecting portion of the lower shelf and the other of which is on the upper shelf, and means for longitudinally moving the successive single components on the first projecting portion of the lower shelf into a position below the successive single components on the upper shelf to form successive pairs of components and for then moving the components of the said successive pairs in unison longitudinally out of their last said positions so that the upper component of each pair is moved beyond the said upper shelf and is thereby permitted to engage the lower component of the said pair on the said second projecting portion of the lower shelf.

10. In a machine for assembling book components, the combination of two holders for stacks of components longitudinally spaced at the front, two closely spaced superposed longitudinally extending parallel shelves adjacent the holders and at the rear thereof, the lower shelf having a portion extending longitudinally beyond the upper shelf, two horizontal longitudinal bars adjacent the tops of the stacks and adjacent the rear thereof, means for simultaneously reciprocating the said bars vertically, vacuum cups carried by the respective bars and positioned for engaging successive single components at the tops of the respective stacks and for moving the said components upward as the bars move upward, two simultaneously acting transversely reciprocating means for engaging and gripping the respective single components successively lifted by the vacuum cups and for transferring the said components rearward to predetermined longitudinally spaced positions one of which is on the longitudinally extending portion of the lower shelf and the other of which is on the upper shelf, and means for longitudinally moving the successive single components on the lower shelf into a position below the successive single components on the upper shelf to form successive pairs of components and for then moving the components of the said successive pairs in unison longitudinally out of their last said positions so that the upper component of each pair is moved beyond the said upper shelf and is thereby permitted to engage the lower component of the said pair.

11. A machine for assembling book components as set forth in claim 10, wherein the two transversely reciprocating component transfer means move forward below the respective bars when the bars are in their upper positions.

12. A machine for assembling book components as set forth in claim 10, wherein the vacuum cups are longitudinally adjustable relatively to each other relatively to the said longitudinal bars.

13. In a machine of the class described, the combination of a holder for a stack of book components, means for lifting successive single components from the top of the stack, a transversely reciprocable slide for transferring the successive lifted components to a predetermined position transversely spaced from the stack, means connected with the slide for reciprocating it, jaws at the front of the slide for engaging a component, a member movable longitudinally of the slide for causing the movement of one jaw into and out of component engaging relationship with the other jaw, and means operable in timed relation with the reciprocation of the slide for moving the said member relatively to the slide and in the direction of slide movement to cause jaw movement for engaging the component when the slide is moving oppositely and is near one end of its path of reciprocation and is adjacent the top of the stack and for moving the slide in the opposite direction to cause jaw movement for releasing the component when the slide is near the opposite end of its path of reciprocation.

14. The combination as set forth in claim 13, wherein the means for moving the member is a slide movable longitudinally in the same direction as the first said slide, and wherein means is provided for moving the last said slide in timed relation with the first said slide, the second said slide engaging the member to move it in one direction relatively to the first slide when the latter is near one end of its movement and engaging the member to move it in the opposite direction relatively to the first said slide when the latter is near the other end of its movement.

15. In a machine of the class described, the combination of a holder for a stack of book components, means for lifting successive single components from the top of the stack, a transversely reciprocable slide for transferring the successive lifted components to a predetermined position spaced from the stack, a rotatable crank, power connections between the crank and the slide for reciprocating the latter as the former is rotated, the slide being moved relatively slowly near the ends of its reciprocations as the crank passes its dead center positions, jaws at the front of the slide for engaging a component, a member movable longitudinally of the slide for causing the movement of one jaw into and out of component engaging relationship with the other jaw, and means operable in timed relation with the reciprocation of the slide for moving the said member in one direction relatively to the slide to cause jaw movement for engaging the component when the slide is adjacent the top of the stack and is near one end of its path of reciprocation with the crank near one dead center position and for moving the slide in the opposite direction to cause jaw movement for releasing the component when the slide is near the opposite end of its path of reciprocation with the crank near the other dead center position.

16. In a machine for assembling and pasting book components, the combination of two holders for stacks of components longitudinally spaced at the front, two closely spaced superposed longitudinally extending parallel shelves adjacent the holders and at the rear thereof, the lower shelf having a portion extending longitudinally beyond the upper shelf, two simultaneously acting means for engaging successive single components at the tops of the respective stacks and for transferring the said components rearward to predetermined longitudinally spaced positions one of which is on the longitudinally extending portion of the lower shelf and the other of which is on the upper shelf, a transverse bar above the lower shelf and parallel therewith which bar is between the said predetermined positions of the components, means for longitudinally moving the successive single components on the lower shelf into a position below the successive single components on the upper shelf to form successive pairs of components and for then moving the components of the said successive pairs in unison longitudinally out of their last said positions so that the upper component of each pair is moved beyond the said upper shelf and is thereby permitted to engage the lower component of the said pair, and a pasting unit carried by the said transverse bar and including a pasting disc which serves to paste each component on the lower shelf along one longitudinal zone as the component is moved longitudinally along the said shelf.

17. In a machine for assembling and pasting book components, the combination of two holders for stacks of components longitudinally spaced at the front, two closely spaced superposed longitudinally extending parallel shelves adjacent the holders and at the rear thereof, the lower shelf having a portion extending longitudinally beyond the upper shelf, two simultaneously acting means for engaging successive single components at the tops of the respective stacks and for transferring the said components rearward to predetermined longitudinally spaced positions one of which is on the longitudinally extending portion of the lower shelf and the other of which is on the upper shelf, a transverse bar above the lower shelf and parallel therewith which bar is between the said predetermined positions of the components, a transverse power driven shaft above the lower shelf adjacent the said bar and parallel therewith, means for longitudinally moving the successive single components on the lower shelf into a position below the successive single components on the upper shelf to form successive pairs of components and for then moving the components of the said successive pairs in unison longitudinally out of their last said positions so that the upper component of each pair is moved beyond the said upper shelf and is thereby permitted to engage the lower component of the said pair, a pasting unit carried by the said transverse bar and including a pasting disc which serves to paste each component on the lower shelf along one longitudinal zone as the component is moved longitudinally along the said shelf, and gearing connecting the transverse power driven shaft with the pasting disc of the pasting unit for rotating the said disc.

18. In a machine for assembling and pasting book components, the combination of two holders for stacks of components longitudinally spaced at the front, two closely spaced superposed longitudinally extending parallel shelves adjacent the holders and at the rear thereof, the lower shelf having a portion extending longitudinally beyond the upper shelf, two simultaneously acting means for engaging successive single components at the tops of the respective stacks and for transferring the said components rearward to predetermined longitudinally spaced positions one of which is on the longitudinally extending portion of the lower shelf and the other of which is on the upper shelf, a transverse bar above the lower shelf and parallel therewith which bar is between the said predetermined positions of the components, means for longitudinally moving the successive single components on the lower shelf into a position below the successive single components on the upper shelf to form successive pairs of components and for then moving the components of the said successive pairs in unison longitudinally out of their last said positions so that the upper component of each pair is moved beyond the said upper shelf and is thereby permitted to engage the lower component of the said pair, a pasting unit above the lower shelf and between the said predetermined positions of the components, the said pasting unit including a pasting disc which serves to paste each component on the lower shelf along one longitudinal zone as the component is moved longitudinally along the said shelf, and means for supporting the pasting unit on the transverse bar in any one of a plurality of transversely adjusted positions.

19. In a machine for assembling and pasting book components, the combination of a shelf for receiving successive similar components directly thereon in a predetermined position and adapted for also receiving successive other similar components in a second longitudinally spaced predetermined position and respectively in face-to-face relationship with the successive first said components, automatic means for moving the successive first said components longitudinally along the shelf from the first said position to the second said position and for then also moving the successive second said components in unison with the successive first said components, and two separate means for simultaneous pasting the successive first said components as they move along the shelf from the first said predetermined position which said two pasting means are positioned to apply paste along two longitudinal zones adjacent the opposite edges of each component.

20. In a machine for assembling and pasting book components, the combination of a shelf for receiving successive similar components directly thereon in a predetermined position and adapted for also receiving successive other similar components in a second longitudinally spaced predetermined position and respectively in face-to-face relationship with the successive first said components, automatic means for moving the successive first said components longitudinally along the shelf from the first said position to the second said position and for then also moving the successive second said components in unison with the successive first said components, means for pasting the successive first said components as they move along the shelf from the first said predetermined position which pasting means is positioned to apply paste along a longitudinal zone adjacent one edge of each component, and a separate second means for simultaneously pasting the successive first said components as they move along the shelf from the first said predetermined position which second pasting means is positioned to apply paste along a longitudinal zone adjacent the opposite edge of each component and which second said pasting means is transversely adjustable with respect to the first said pasting means.

21. In a machine for assembling and pasting book components, the combination of two holders for stacks of components longitudinally spaced at the front, two closely spaced superposed longitudinally extending parallel shelves adjacent the holders and at the rear thereof, the lower shelf having a portion extending longitudinally beyond the upper shelf, two simultaneously acting means for engaging successive single components at the tops of the respective stacks and for transferring the said components rearward to predetermined longitudinally spaced positions one of which is on the longitudinally extending portion of the lower shelf and the other of which is on the upper shelf, means for longitudinally moving the successive single components on the lower shelf into a position below the successive single components on the upper shelf to form successive pairs of components and for then moving the components of the said successive pairs in unison longitudinally out of their last said positions so that the upper component of each pair is moved beyond the said upper shelf and is thereby permitted to engage the lower component of the said pair, a pasting unit above the lower shelf and between the said predetermined positions of the components, the said unit including a pasting disc which serves to paste each component on the lower shelf along one longitudinal zone as the said component is moved longitudinally along the said shelf, and a second pasting unit separate from the first pasting unit and transversely spaced therefrom which second unit is also positioned between the predetermined positions of the components, the said second unit including a pasting disc which pastes each component on the lower shelf along a second longitudinal zone transversely spaced from the first said zone as the component is moved longitudinally along the said shelf.

22. A machine for assembling and pasting book components as set forth in claim 21, wherein two opposed rollers are provided adjacent the discharge end of the lower shelf for applying pressure to the two components along the zones of pasting and during the longitudinal movement of the said components.

23. In a machine for assembling and pasting book components, the combination of two holders for stacks of components longitudinally spaced at the front, two closely spaced superposed longitudinally extending parallel shelves adjacent the holders and at the rear thereof, the lower shelf having a portion extending longitudinally beyond the upper shelf, two simultaneously acting means for engaging successive single components at the tops of the respective stacks and for transferring the said components rearward to predetermined longitudinally spaced positions one of which is on the longitudinally extending portion of the lower shelf and the other of which is on the upper shelf, means for longitudinally moving the successive single components on the lower shelf into a position below the successive single components on the upper shelf to form successive pairs of components and for then moving the components of the said successive pairs in unison longitudinally out of their last said positions so that the upper component of each pair is moved beyond the said upper shelf and is thereby permitted to engage the lower component of the said pair, two transversely spaced pasting units above the lower shelf and between the said predetermined positions of the components, the said units including pasting discs which serve to paste each component on the lower shelf along two transversely spaced longitudinal zones as the said component is moved longitudinally along the said shelf, and means for supporting at least one of the units in any one of a plurality of transversely adjusted positions.

24. In a machine for assembling and pasting book components, the combination of two holders for stacks of components longitudinally spaced at the front, two closely spaced superposed longitudinally extending parallel shelves adjacent the holders and at the rear thereof, the lower shelf having a portion extending longitudinally beyond the upper shelf, two simultaneously acting means for engaging successive single components at the tops of the respective stacks and for transferring the said components rearward to predetermined longitudinally spaced positions one of which is on the longitudinally extending portion of the lower shelf and the other of which is on the upper shelf, a transverse bar above the lower shelf and parallel therewith which bar is between the said predetermined positions of the components, means for longitudinally moving the successive single components on the lower shelf into a position below the successive single components on the upper shelf to form successive pairs of components and for then moving the components of the said successive pairs in unison longitudinally out of their last said positions so that the upper component of each pair is moved beyond the said upper shelf and is thereby permitted to engage the lower component of the said pair, a pasting unit carried by the transverse bar, the said unit including a pasting disc which serves to paste each component on the lower shelf along one longitudinal zone as the said component is moved longitudinally along the said shelf, and a second pasting unit separate from the first pasting unit and carried by the transverse bar, the said second unit being transversely spaced from the first unit and including a pasting disc which pastes each component on the lower shelf along a second longitudinal zone transversely spaced from the first said zone as the component is moved longitudinally along the said shelf.

25. In a machine for assembling and pasting book components, the combination of two holders for stacks of components longitudinally spaced at the front, two closely spaced superposed longitudinally extending parallel shelves adjacent the holders and at the rear thereof, the lower shelf having a portion extending longitudinally beyond the upper shelf, two simultaneously acting means for engaging successive single components at the tops of the respective stacks and for transferring the said components rearward to predetermined longitudinally spaced positions one of which is on the longitudinally extending portion of the lower shelf and the other of which is on the upper shelf, a transverse bar above the lower shelf and parallel therewith which bar is between the said predetermined positions of the components, a transverse power driven shaft above the lower shelf adjacent the said bar and parallel therewith, means for longitudinally moving the successive single components on the lower shelf into a position below the successive single components on the upper shelf to form successive pairs of components and for then moving the components of the said successive pairs in unison longitudinally out of their last said positions so that the upper component of each pair is moved beyond the said upper shelf and is thereby permitted to engage the lower component of the said pair, a pasting unit carried by the transverse bar, the said unit including a pasting disc which serves to paste each component on the lower shelf along one longitudinal zone as the said component is moved longitudinally along the said shelf, a second pasting unit separate from the first pasting unit and carried by the transvese bar, the said second unit being transversely spaced from the first unit and including a pasting disc which pastes each component on the lower shelf along a second longitudinal zone transversely spaced from the first said zone as the component is moved longitudinally along the said shelf, and gearing connecting the transverse power driven shaft with the pasting discs of the two units for rotating the said discs.

26. In a machine for assembling and pasting book components, the combination of a shelf for receiving successive similar components directly thereon in a predetermined position and adapted for also receiving successive other similar components in a second longitudinally spaced predetermined position and respectively in face-to-face relationship with the successive first said components, automatic means for moving the successive first said components longitudinally along the shelf from the first said position to the second said position and for then also moving the successive second said components in unison with the successive first said components, means including a rotatable disc for pasting the successive first said components as they move along the shelf from the first said predetermined position, the disc of the said pasting means being adjacent but normally out of engagement with the edge portions of the components, and means adjacent the disc for momentarily lifting each successive component to be pasted to engage it with the disc so as to effect pasting along a longitudinal zone shorter than the length of the said component.

27. In a machine for assembling and pasting book components, the combination of a shelf for receiving successive similar components directly thereon in a predetermined position and adapted for also receiving successive other similar components in a second longitudinally spaced predetermined position and respectively in face-to-face relationship with the successive first said components, automatic means for moving the successive first said components longitudinally along the shelf from the first said position to the second said position and for then also moving the successive second said components in unison with the successive first said components, means for pasting the successive first said components as they move along the shelf from the first said predetermined position which pasting means serves to apply paste along a longitudinal zone adjacent one edge of each component, a second means for pasting the successive first said components as they move along the shelf from the first said predetermined position to which second said pasting means serves to apply paste along a longitudinal zone adjacent the opposite edge of each component, and means for interrupting the action of the second said pasting means in timed relation to the longitudinal movement of the components so that the zone of pasting on each component is shorter than the length of the said component.

28. In a machine for assembling and pasting book components, the combination of a shelf for receiving successive similar components directly thereon in a predetermined position and adapted for also receiving successive other similar components in a second longitudinally spaced predetermined position and respectively in face-to-face relationship with the successive first said components, automatic means for moving the successive first said components longitudinally along the shelf from the first said position to the second said position and for then also moving the successive second said components in unison with the successive first said components, means for pasting the successive first said components as they move along the shelf from the first said predetermined position which pasting means serves to apply paste along a longitudinal zone adjacent one edge of each component, and a second means including a rotatable disc for pasting the successive first said components as they move along the shelf from the first said predetermined position, the disc of the second said pasting means being adjacent but normally out of engagement with the opposite edge portions of the components, and means adjacent the disc for momentarily lifting each successive component to be pasted to engage it with the disc so as to effect pasting along a longitudinal zone shorter than the length of the said component.

29. In a machine for assembling and pasting book components, the combination of two holders for stacks of components longitudinally spaced at the front, two closely spaced superposed longitudinally extending parallel shelves adjacent the holders and at the rear thereof, the lower shelf having a portion extending longitudinally beyond the upper shelf, two simultaneously acting means for engaging successive single components at the tops of the respective stacks and for transferring the said components rearward to predetermined longitudinally spaced positions one of which is on the longitudinally extending portion of the lower shelf and the other of which is on the upper shelf, means for longitudinally moving the successive single components on the lower shelf into a position below the successive single components on the upper shelf to form successive pairs of components and for then moving the components of the said successive pairs in unison longitudinally out of their last said positions so that the upper component of each pair is moved beyond the said upper shelf and is thereby permitted to engage the lower component of the said pair, a pasting unit above the lower shelf and between the said predetermined positions of the components, the said unit including a pasting disc which serves to paste each component on the lower shelf along one zone as the component is moved longitudinally along the said shelf, and means for interrupting the action of the pasting disc so that the zone of pasting on each component is shorter than the said component.

30. In a machine for assembling and pasting book components, the combination of two holders for stacks of components longitudinally spaced at the front, two closely spaced superposed longitudinally extending parallel shelves adjacent the holders and at the rear thereof, the lower shelf having a portion extending longitudinally beyond the upper shelf, two simultaneously acting means for engaging successive single components at the tops of the respective stacks and for transferring the said components rearward to predetermined longitudinally spaced positions one of which is on the longitudinally extending portion of the lower shelf and the other of which is on the upper shelf, means for longitudinally moving the successive single components on the lower shelf into a position below the successive single components on the upper shelf to form successive pairs of components and for then moving the components of the said successive pairs in unison longitudinally out of their last said positions so that the upper component of each pair is moved beyond the said upper shelf and is thereby permitted to engage the lower component of the said pair, a pasting unit above the lower shelf and between the said predetermined positions of the components, the said unit including a pasting disc which is normally out of engagement with each component on the lower shelf as the component is moved longitudinally along the said shelf, and means adjacent the disc for momentarily lifting each successive component to engage it with the disc so as to effect pasting along a longitudinal zone shorter than the length of the component.

31. In a machine for assembling and pasting book components, the combination of two holders for stacks of components longitudinally spaced at the front, two closely spaced superposed longitudinally extending parallel shelves adjacent the holders and at the rear thereof, the lower shelf having a portion extending longitudinally beyond the upper shelf, two simultaneously acting means for engaging successive single components at the tops of the respective stacks and for transferring the said components rearward to predetermined longitudinally spaced positions one of which is on the longitudinally extending portion of the lower shelf and the other of which is on the upper shelf, means for longitudinally moving the successive single components on the lower shelf into a position below the successive single components on the upper shelf to form successive pairs of components and for then moving the components of the said successive pairs in unison longitudinally out of their last said positions so that the upper component of each pair is moved beyond the said upper shelf and is thereby permitted to engage the lower component of the said pair, two transversely spaced pasting units above the lower shelf and between the said predetermined positions of the components, which units respectively include pasting discs which serve to paste each component on the lower shelf along two transversely spaced horizontal zones as the component is moved longitudinally along the shelf, the pasting disc of one unit being normally out of engagement with the said components, and means adjacent the last said disc for momentarily lifting each successive component to engage it with the disc so as to effect pasting along a longitudinal zone shorter than the length of the component.

References Cited in the file of this patent

UNITED STATES PATENTS

| Number | Name | Date |
|---|---|---|
| 1,145,405 | Cheshire | July 6, 1915 |
| 1,319,716 | Linebaugh | Oct. 28, 1919 |
| 1,575,891 | Ashby | Mar. 9, 1926 |
| 2,239,995 | Daneke | Apr. 29, 1941 |
| 2,295,073 | Blythe | Sept. 8, 1942 |
| 2,374,578 | Bernard | Apr. 24, 1945 |